United States Patent
Fukai

(10) Patent No.: US 7,329,440 B2
(45) Date of Patent: Feb. 12, 2008

(54) LIQUID CRYSTAL COMPOSITION AND LIQUID CRYSTAL ELECTRO-OPTICAL DEVICE

(75) Inventor: Shuji Fukai, Kanagawa (JP)

(73) Assignee: Semiconductor Energy Laboratory Co., Ltd., Kanagawa-Ken (JP)

( * ) Notice: Subject to any disclaimer, the term of this patent is extended or adjusted under 35 U.S.C. 154(b) by 137 days.

(21) Appl. No.: 11/267,145

(22) Filed: Nov. 7, 2005

(65) Prior Publication Data

US 2006/0108562 A1 May 25, 2006

(30) Foreign Application Priority Data

Nov. 19, 2004 (JP) ............... 2004-325112

(51) Int. Cl.
*C09K 19/52* (2006.01)
(52) U.S. Cl. ................ 428/1.3; 252/299.01; 252/299.5
(58) Field of Classification Search ............... 428/1.1, 428/1.3; 252/299.01, 299.5
See application file for complete search history.

(56) References Cited

U.S. PATENT DOCUMENTS

| | | | |
|---|---|---|---|
| 3,915,555 A * | 10/1975 | Leibowitz | 349/84 |
| 5,636,043 A * | 6/1997 | Uemura et al. | 349/156 |
| 5,686,018 A | 11/1997 | Demus et al. | |
| 6,031,593 A * | 2/2000 | Morikawa et al. | 349/155 |
| 6,773,626 B2 * | 8/2004 | Sanada et al. | 252/299.01 |
| 2002/0076511 A1 * | 6/2002 | Sanada et al. | 428/1.1 |

FOREIGN PATENT DOCUMENTS

JP 07-278545 10/1995

\* cited by examiner

*Primary Examiner*—Shean C Wu
(74) *Attorney, Agent, or Firm*—Nixon Peabody LLP; Jeffrey L. Costelli

(57) ABSTRACT

It is an object of the present invention to provide a liquid crystal composition with high response speed without lowering various characteristics of a liquid crystal, such as voltage holding rate and phase transition temperature. One feature of the invention is that a nematic liquid crystal and an inert fluid containing fluorine ($C_mF_n$ or $C_mF_nO$ (n and m are natural numbers)) are mixed. Another feature of the invention is that a content of a fluorine-based inert solution ($C_mF_n$ or $C_mF_nO$ (n and m are natural numbers)) is 10 wt % or more to 60 wt % or less with respect to the nematic liquid crystal.

12 Claims, 22 Drawing Sheets

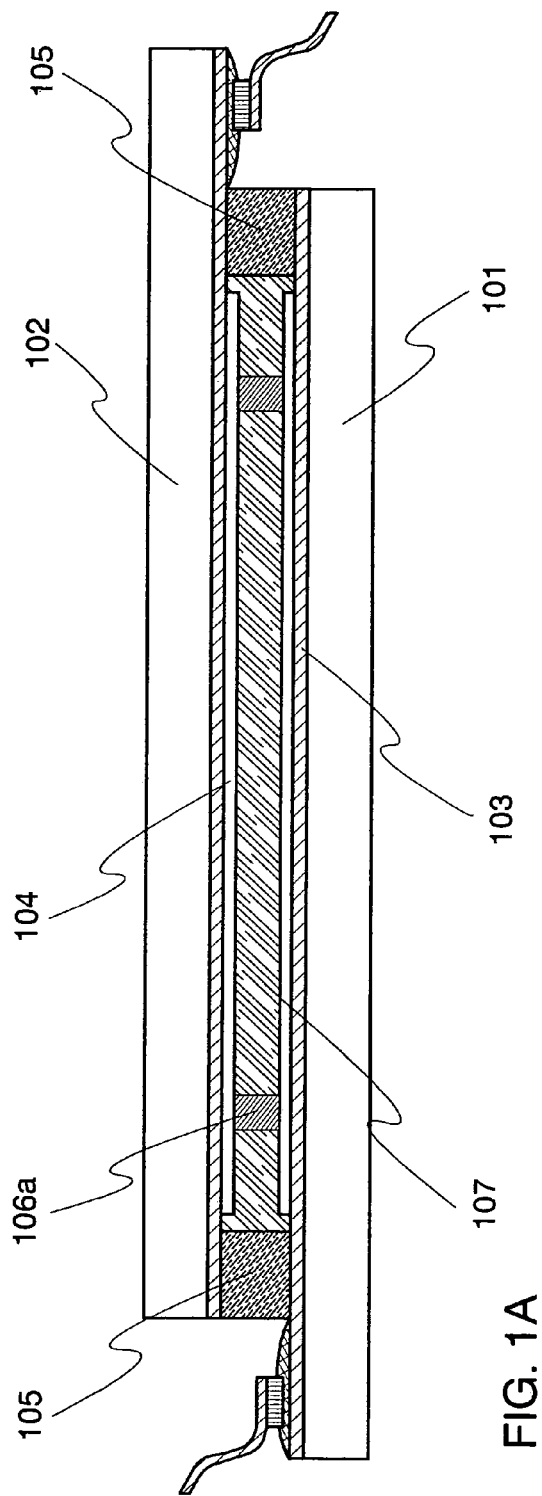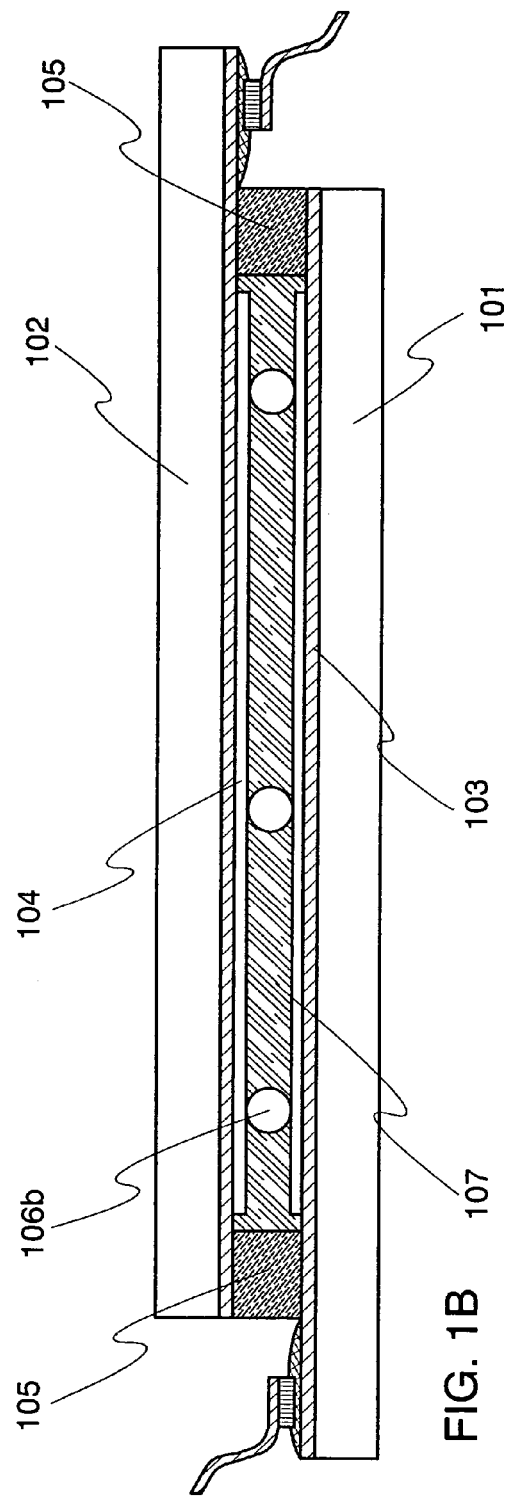

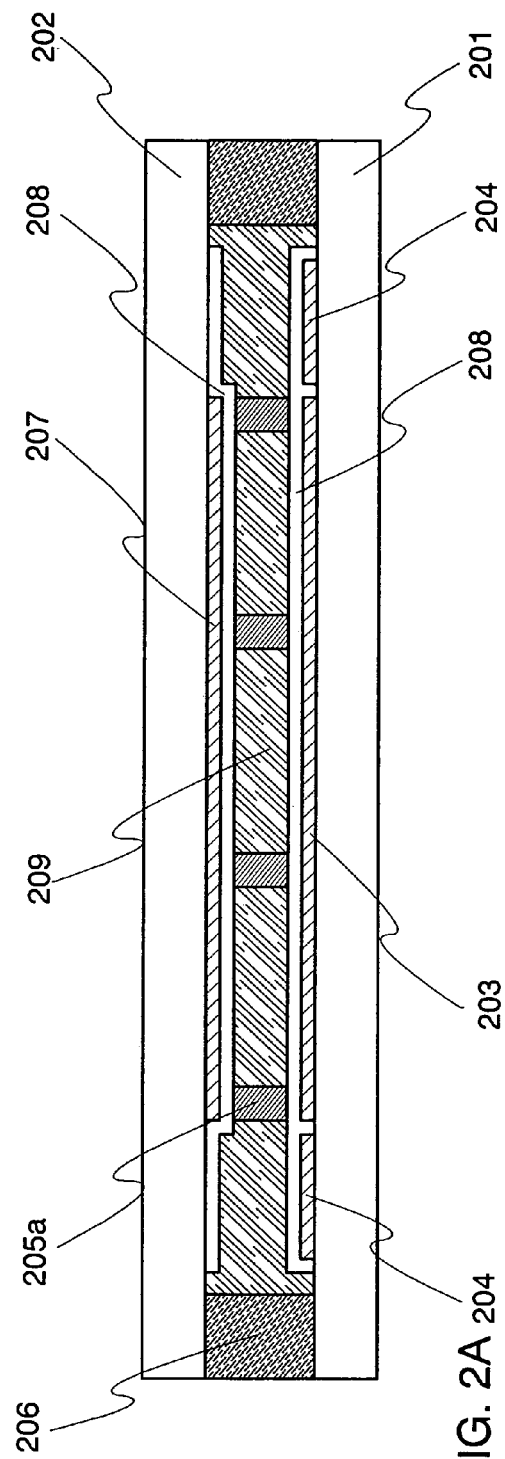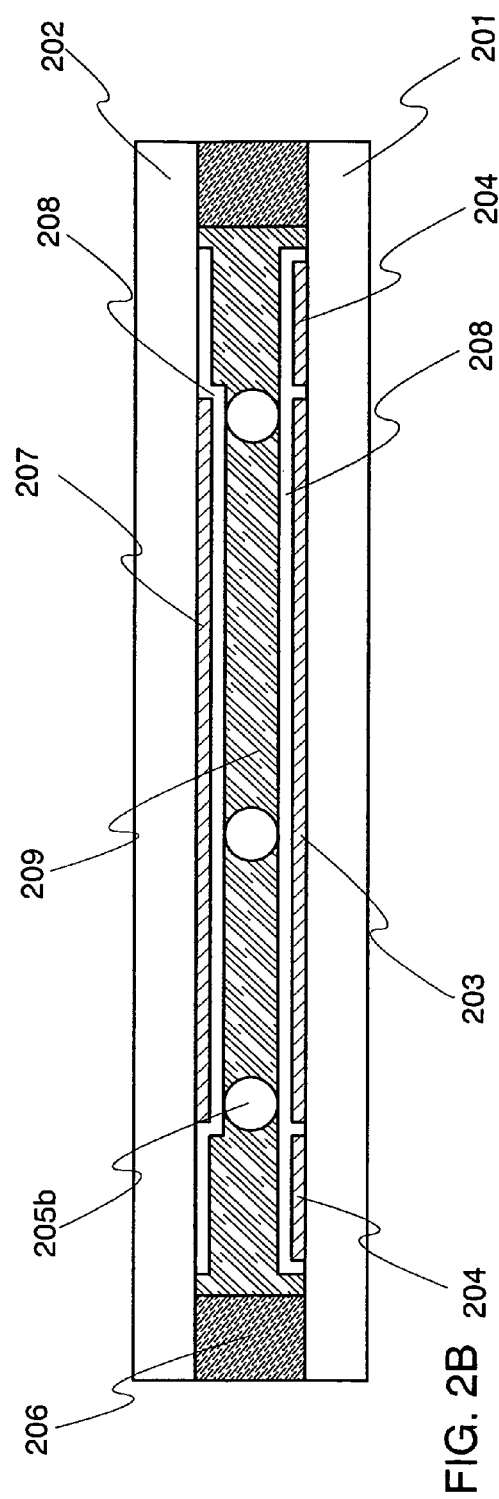

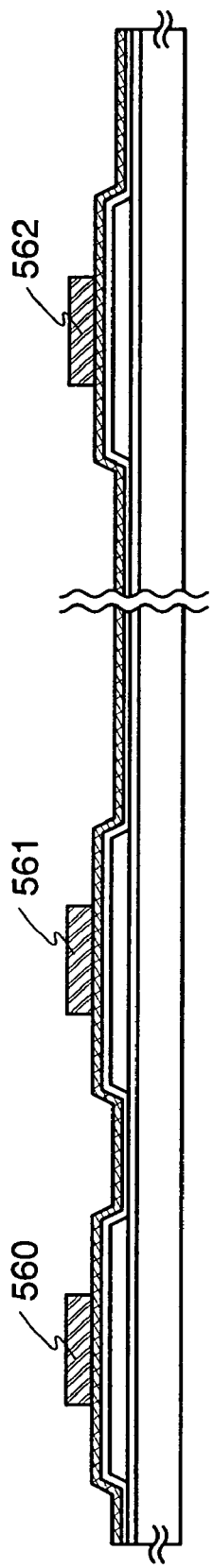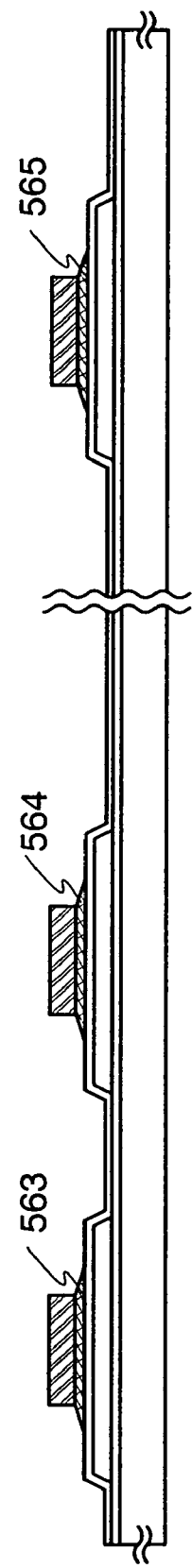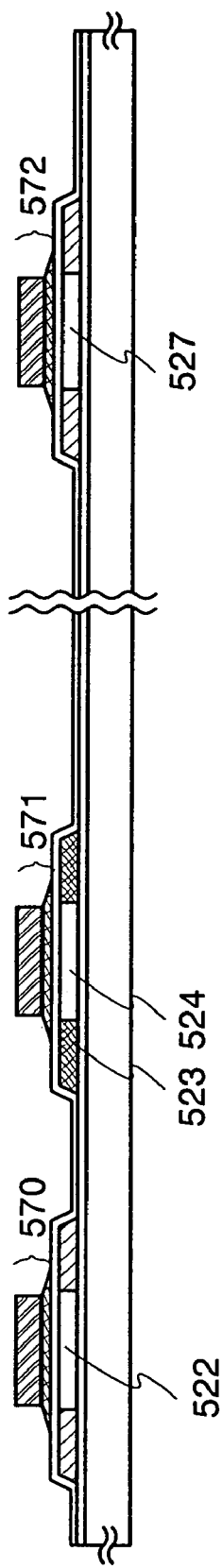
FIG. 8A
FIG. 8B
FIG. 8C

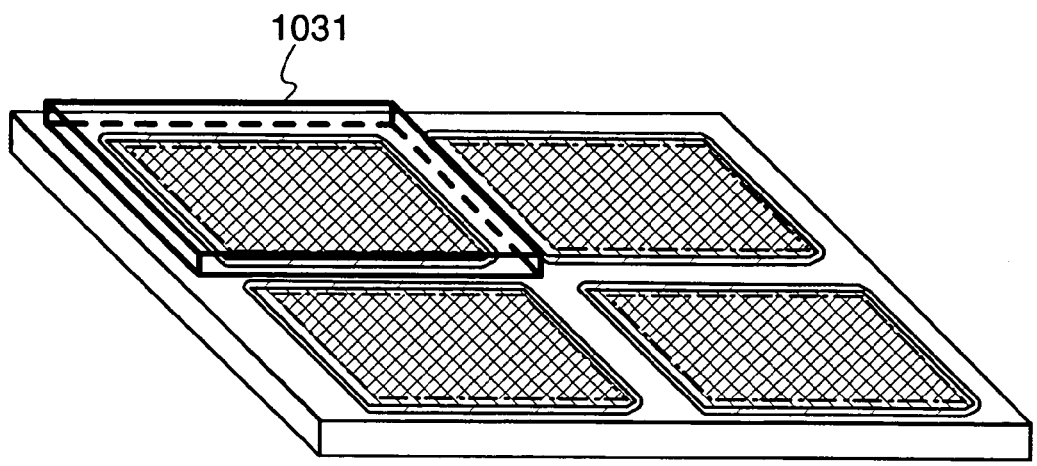
FIG. 16A
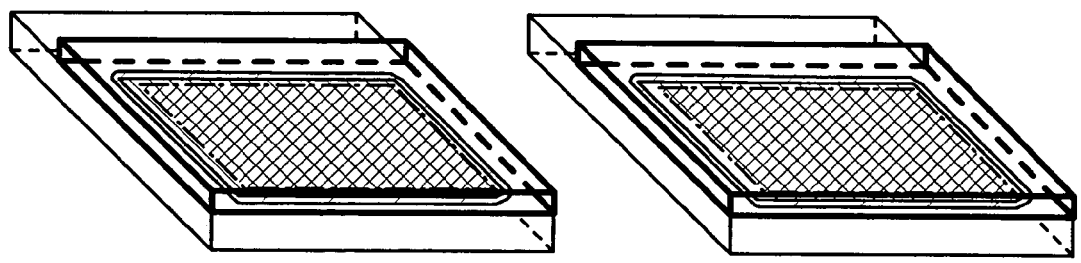
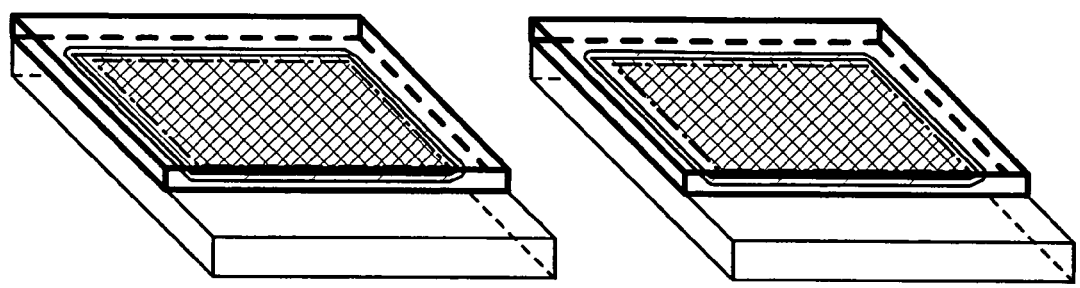
FIG. 16B

LIQUID CRYSTAL COMPOSITION AND LIQUID CRYSTAL ELECTRO-OPTICAL DEVICE

BACKGROUND OF THE INVENTION

1. Field of the Invention

The present invention relates to a nematic liquid crystal composition used for a liquid crystal display element and use of the composition for an electro-optical display element.

2. Description of the Related Art

Nowadays, a liquid crystal display device can be manufactured to be lightweight, miniaturized, thinned, or the like and is being used for various usages as a display device, and is especially required to improve response speed with the development of a driving method using a liquid crystal with high response speed such as a field sequential color method. In addition, it is known that the response time of a liquid crystal is proportional to viscosity, and the decrease of viscosity represents the shortening of response time. By using this, an attempt to decrease the viscosity of a liquid crystal is made by a method such as a method of mixing two or more kinds of liquid crystals (Patent Document 1: Japanese Patent Laid-Open No. H7-278545).

SUMMARY OF THE INVENTION

However, by an above-described method of mixing two or more kinds of liquid crystals, liquid crystals are influenced one another, and various characteristics of a liquid crystal, such as voltage holding rate and phase transition temperature, are changed. It is an object of the present invention to provide a liquid crystal composition with high response speed without lowering various characteristics of a liquid crystal, such as voltage holding rate and phase transition temperature.

One feature of the invention is that a liquid crystal composition of a nematic liquid crystal and an inert fluid containing fluorine ($C_mF_n$ or $C_mF_nO$ (n and m are natural numbers)) is used as a liquid crystal material, and accordingly, a liquid crystal composition with high response speed of a liquid crystal can be obtained. At this time, a biphenyl-based material, a terphenyl-based material, a phenyl cyclohexane-based material, a pyrimidine-based material, a fluorine-based material, a tolan-based material, an ester-based material, or the like can be used as the nematic liquid crystal. Further, perfluoro(2-butyltetrahydrofuran)$C_8F_{16}O$, $C_8F_{18}$, $C_6F_{14}$, or the like can be used as a fluorine-based inert solution. However, the invention is not limited to these. The amount of the inert fluid containing fluorine may be 10 wt % to 60 wt %, preferably approximately 20 wt % to 30 wt % with respect to the amount of the liquid crystal composition.

In accordance with the invention, response time of a liquid crystal can be fastened. Although a liquid crystal composition of a nematic liquid crystal and an inert fluid containing fluorine ($C_mF_n$ or $C_mF_nO$ (n and m are natural numbers)) is used, the decrease of voltage holding rate or the change of phase transition temperature is not observed.

These and other objects, features, and advantages of the present invention will become more apparent upon reading of the following detailed description along with the accompanied drawings.

BRIEF DESCRIPTION OF THE DRAWINGS

FIG. 1A is a schematic view of a liquid crystal display device according to the present invention using a columnar spacer;

FIG. 1B is a schematic view of a liquid crystal display device according to the invention using a spherical spacer;

FIG. 2A is a schematic view of a liquid crystal display device according to the invention using a columnar spacer;

FIG. 2B is a schematic view of a liquid crystal display device according to the invention using a spherical spacer;

FIGS. 8A to 8C are views showing a manufacturing process of a semiconductor device;

FIGS. 16A and 16B are views showing a manufacturing process of a liquid crystal display device using a liquid crystal dropping method according to the invention;

DETAILED DESCRIPTION OF THE INVENTION

Figure 3:
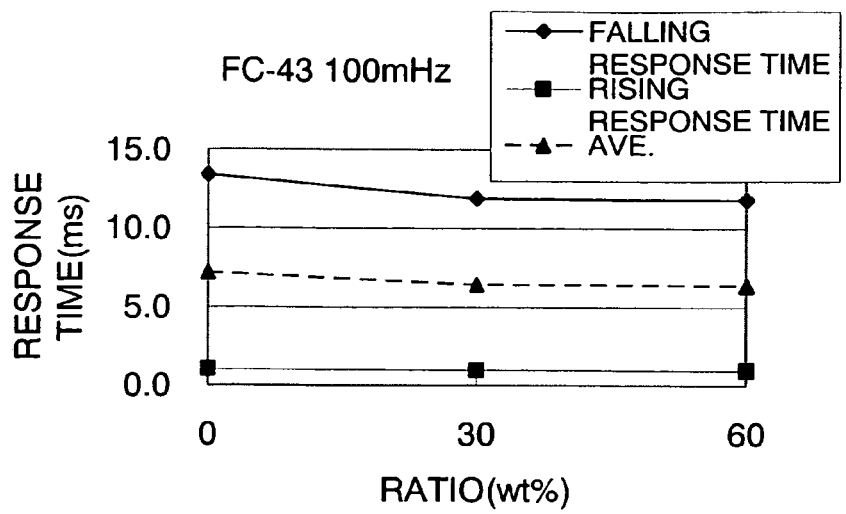
FIG. 3 is a view showing characteristics of response time with respect to the amount of an inert fluid containing fluorine to be added of a liquid crystal display device in Embodiment 1 according to the invention.

Hereinafter, embodiment modes according to the present invention are described with reference to the drawings. However, it is easily understood by those who are skilled in the art that embodiments and details herein disclosed can be modified in various ways without departing from the purpose and the scope of the present invention. Therefore, it should be noted that the description of embodiment modes to be given below should not be interpreted as limiting the present invention. Through the drawings of the embodiment modes, like components are denoted by like numerals and will not be further explained.

Embodiment Mode 1

Hereinafter, a method of manufacturing a liquid crystal electro-optical device is shown.

FIGS. 1A and 1B are cross-sectional views of a liquid crystal display device in accordance with the present invention. Here, a case of applying the invention to a liquid crystal display device having the most simple structure is explained as an example. Reference numerals 101 and 102 denote light-transmitting substrates; 103, a light-transmitting conductive film; 104, an orientation film; 105, a seal material; 106a, a columnar spacer; 106b, a spherical spacer; and 107, a liquid crystal composition.

The light-transmitting conductive film 103 is formed over the light-transmitting substrates 101 and 102. The substrates are formed from non-alkaline glass or quartz. The substrates may be formed from a material having flexibility, for example, a plastic material such as polyimide or polycarbonate as long as the substrate has a light-transmitting property. Thus, a light-transmitting conductive film formed from a known material by a known method can be used as the light-transmitting conductive film. For example, an oxide film of indium and tin (Indium-Tin-Oxide), tin oxide, zinc oxide, or the like may be used.

The orientation film 104 can be formed from a material such as polyimide or polyamide, which is used for a liquid crystal display device generally. The material of the orientation film is selected in response to an operation mode of a liquid crystal which is to be used. In the case of forming the orientation film by applying over the substrate, an orientation film formed by a printing method, an orientation film formed by applying to the substrate by a spinner, and the like can be utilized.

The orientation treatment is conducted to the orientation film 104 to orient a liquid crystal. The orientation treatment is selected in response to an operation mode of a liquid crystal which is to be used. For example, the treatment is conducted so that a major axis of a liquid crystal molecule is parallel to the substrate in TN mode. In addition, optical orientation treatment using an ultraviolet light or the like may be used.

An adhesive material is utilized as the seal material 105 in order that a liquid crystal between the substrates is finally sealed so as not to leak outside and these substrates are adhered to each other.

As for the seal material 105, an epoxy resin, an acrylic resin, or the like can be given as the adhesive material. Any of a heat curable type and a photo curable type may be used as a curing method.

It is to be noted that an additive agent which is hardly deformed due to pressure may be added to the seal material in order to keep a fixed distance between the substrates if necessary. This is effective for reducing the variation of the distance between the substrates of a liquid crystal display device if the additive agent is used when the distance of the substrates is approximately 3 μm or more. At this time, a spacer having a spherical shape and a fixed diameter is used as the additive agent. The additive agent can be formed from an inorganic material such as $SiO_2$ or an organic material containing divinylbenzene as its main component.

At this time, the diameter of the spacer to be added is appropriately selected in accordance with the difference of a liquid crystal or an operation mode which is to be used. As an example, the diameter is approximately 2 μm to 5 μm in case of TN mode and approximately 0.5 μm to 3 μm in case of a ferroelectric liquid crystal or antiferroelectric liquid crystal.

Although the amount of the spacer to be added with respect to the seal material depends on a spacer which is to be used, the amount to be added may be approximately 3 wt % in many cases. When the spacer is added too much, the added spacers overlap with each other and a fixed distance between the substrates cannot be held.

Basically, the height of the columnar spacer 106a, which can prevent the seal material from leaking to a pixel portion, is favorable; also, the height can be set so as to be equivalent to the distance between opposing electrodes formed in a pair of substrates, namely the distance between the substrates as a fixed distance. In this embodiment mode, the conductive film, the orientation film, and the like are formed and a step due to these constituents is generated in some cases; therefore, the height is determined in consideration of the step. In other words, for example, the height of the columnar spacer 106a may be 3.8 μm in the case where the distance between the substrate is required to be 4 μm or the case where the step which is higher than the surface of the substrate by 0.2 μm is generated in a location in which the columnar spacer 106a is to be placed. The columnar spacer corresponds to a gap holding material.

In addition, the spacer may be formed in any of the substrates 101 and 102, and further, may be formed in both of the substrates.

In the case where the columnar spacer 106a is not formed, the spherical spacer 106b is sprayed over the substrate as shown in FIG. 1B. The spherical spacer 106b is a spherical substance formed from an organic substance or an inorganic substance, and a substance and a spraying method used for a conventional liquid crystal display device can be directly used. Generally, when the density of the spacer in the liquid crystal display device is 20 pieces/mm$^2$ to 200 pieces/mm$^2$, a fixed distance of the substrates can be held.

Thus, the seal material 105 and the spacer 106 are provided for any of the pair of substrates 101 and 102 provided with the light-transmitting conductive film 103 and the orientation film 104: thereafter, these substrates are pasted to each other to manufacture a liquid crystal display device.

Next, the liquid crystal composition 107 is explained. The liquid crystal composition 107 is a composite of a nematic liquid crystal and an inert fluid containing fluorine ($C_mF_n$ or $C_mF_nO$ (n and m are natural numbers)). The nematic liquid crystal can be formed from a biphenyl-based material, a terphenyl-based material, a phenyl cyclohexane-based material, a pyrimidine-based material, a fluorine-based material, a tolan-based material, an ester-based material, or the like. The inert fluid containing fluorine is a fluorocarbon-based organic solvent, and expressed as chemical formula of $C_mF_n$ or $C_mF_nO$ (n and m are natural numbers). Specifically, perfluoro(2-butyltetrahydrofuran) $C_8F_{16}O$, $C_8F_{18}$, or $C_6F_{14}$ can be used. For example, FLUORINERT (registered trademark) FC-77, FC-43, or FC-70 manufactured by Sumitomo 3M, Galden (registered trademark) manufactured by Ausimont, or freon (registered trademark) manufactured by Du Pont can be used. However, the invention is not limited to this, and an object which fills the above chemical formula can be obviously used. The amount of the inert fluid containing fluorine may be 10 wt % to 60 wt %, preferably approximately 20 wt % to 30 wt % with respect to the amount of the liquid crystal composition. If the inert fluid containing fluorine is added too much, the ratio of the nematic liquid crystal is reduced and unevenness is generated when panel display is carried out. If the inert fluid containing fluorine is added little, the effect cannot be achieved.

A method of mixing the nematic liquid crystal and the inert fluid containing fluorine ($C_mF_n$ or $C_mF_nO$ (n and m are natural numbers)) is explained. In this embodiment mode, these materials are mixed and stirred for one hour while heated at a transition point (NI point) or more of isotropic phase-nematic phase of the nematic liquid crystal. The nematic liquid crystal and the inert fluid containing fluorine are mixed together by the stir at a transition point (NI point) or more of isotropic phase-nematic phase. At this time, the stir is desirably conducted around a transition point (NI point) of isotropic phase-nematic phase. If the temperature is too high, characteristics of the nematic liquid crystal are changed.

The liquid crystal composition 107 is injected into a liquid crystal cell formed of the substrates 101 and 102 at a temperature higher than a transition point (NI point) of isotropic phase-nematic phase of the nematic liquid crystal utilizing capillary phenomenon. Also in this case, the injection is desirably conducted around a transition point (NI point) of isotropic phase-nematic phase, and if the temperature is too high, characteristics of the nematic liquid crystal are changed. The injection may be conducted by a vacuum injection method. When an oriented state after the injection is verified by being interposed between polarizing plates above a backlight, a state of separation cannot be verified.

In accordance with the above steps, a liquid crystal electro-optical device with high response speed composed of a mixture of a nematic liquid crystal and an inert fluid containing fluorine ($C_mF_n$ or $C_mF_nO$ (n and m are natural numbers)) can be manufactured.

Embodiment Mode 2

FIGS. 2A and 2B are cross-sectional views of a liquid crystal display device in accordance with the present invention. Here, a case where the invention is applied to an active matrix liquid crystal display device is explained as an example. It is to be noted that a driver circuit is formed in the same substrate as an active matrix substrate as an example here. Reference numeral 201 denotes an active matrix substrate; 202, a counter substrate; 203, a pixel portion; 204, a driver circuit (gate driver) for controlling the pixel portion 203; 205a, a columnar spacer; 205b, a spherical spacer; 206, a seal material; 207, a counter electrode; 208, an orientation film; and 209, a liquid crystal composition. The pixel portion corresponds to a pixel region.

As for the active matrix substrate 201, a light-transmitting substrate provided with a pixel electrode and a signal electrode is used. The active matrix substrate is formed from non-alkaline glass or quartz. The active matrix substrate may be formed from a material having flexibility, for example, a plastic material such as polyimide or polycarbonate as long as the substrate has a light-transmitting property. Thus, an object having a known circuit configuration and formed from a known material can be used as the active matrix substrate. As an active matrix substrate, an object formed over a glass substrate, an object formed over a Si wafer, or an object formed over a metal substrate can be used.

As for the active matrix substrate 201, a substrate provided with a pixel circuit using an active element or a substrate in which a driver circuit is also formed over the same substrate in the periphery of a pixel circuit can be used.

As for the counter substrate 202, a light-transmitting substrate can be used. The substrate is formed from non-alkaline glass or quartz. In addition to this, a material having flexibility, for example, a plastic material such as polyimide or polycarbonate may be used.

As for the counter substrate 202, a substrate formed by a known technique, such as a substrate in which a color filter over the substrate is processed in a desired shape to perform color display as a liquid crystal display device, a substrate having only a transparent electrode and a black matrix, or the like, can be used.

The orientation film 208 can be formed from a material such as polyimide or polyamide, which is used for a liquid crystal display device generally. The material of the orientation film is selected in response to an operation mode of a liquid crystal which is to be used. In the case of forming the orientation film by applying over the substrate, an orientation film formed by a printing method, an orientation film formed by applying to the substrate by a spinner, and the like can be utilized.

The orientation film 208 is generally formed from a material having an electrically insulating property; therefore, the orientation film is processed in a desired shape so that the surface of the electrode is exposed to be able to electrically connect the signal electrode formed over the substrate and an external electric circuit. A method by a printing method is desirable to process the orientation film in a desired shape.

The orientation treatment is conducted to the orientation film 208 to orient a liquid crystal. The orientation treatment is selected in response to an operation mode of a liquid crystal which is to be used. For example, the treatment is conducted so that a major axis of a liquid crystal molecule is parallel to the substrate in TN mode. In addition, optical orientation treatment using an ultraviolet light or the like may be used.

An adhesive material is utilized as the seal material 105 in order that a liquid crystal between the substrate is finally sealed so as not to leak outside and that these substrates are adhered to each other.

As the seal material 206, an epoxy resin, an acrylic resin, or the like can be given as the adhesive material. Any of a heat curable type or a photo curable type may be used as a curing method.

It is to be noted that an additive agent which is hardly deformed due to pressure may be added to the seal material in order to keep a fixed distance between the substrates if necessary. This is effective for reducing the variation of the distance between the substrates of a liquid crystal display device if the additive agent is used when the distance of the substrates is approximately 3 µm or more. At this time, a spacer having a spherical shape and a fixed diameter is used as the additive agent. The additive agent can be formed from an inorganic material such as $SiO_2$ or an organic material containing divinylbenzene as its main component.

At this time, the diameter of the spacer to be added is appropriately selected in accordance with the difference of a liquid crystal or an operation mode which is to be used. As an example, the diameter is approximately 2 μm to 5 μm in case of TN mode and approximately 0.5 μm to 3 μm in case of a ferroelectric liquid crystal or antiferroelectric liquid crystal.

Although the amount of the spacer to be added with respect to the seal material depends on a spacer which is to be used, the amount to be added may be approximately 3 wt % in many cases. If the spacer is added too much, the added spacers overlap with each other and a fixed distance between the substrates cannot be held.

Basically, the height of the columnar spacer 205a, which can prevent the seal material from leaking to a pixel portion, is favorable; also, the height can be set so as to be equivalent to the distance between opposing electrodes formed in a pair of substrates, namely the distance between the substrates as a fixed distance. Especially, in the case of using the active matrix substrate 201, a signal wiring, a black matrix, a supporting capacitor, an interlayer insulating film, and the like are formed and a step due to these constituents is generated in some cases; therefore, the height is determined in consideration of the step. In other words, for example, the height of the columnar spacer 205a may be 3.8 μm in the case where the distance between the substrate is required to be 4 μm or the case where the step which higher than the surface of the substrate by 0.2 μm is generated in a location in which the columnar spacer 205a is to be placed. The columnar spacer corresponds to a gap holding material.

The columnar spacer may be provided for a portion where there is no influence on display in a pixel portion, for example a portion over a source wiring, a gate wiring, or a black matrix, and may be utilized for maintaining the distance between the substrates.

Although a case of forming the spacer over the active matrix substrate 201 is shown as an example, the invention is not limited to this, and the spacer may be provided for the counter substrate 202 or both substrates. However, in the case of manufacturing the spacer also in the pixel portion, the spacer is desirably formed in the active matrix substrate by photolithography in order that alignment accuracy between the pixel formed over the substrate and the spacer is made to be high. This is because alignment accuracy of a mask aligner is generally higher than that of a pasting device.

In the case where the columnar spacer 205a is not formed, the spherical spacer 205b is sprayed over the substrate as shown in FIG. 2B. The spherical spacer is a spherical substance formed from an organic substance or an inorganic substance, and a substance and a spraying method used for a conventional liquid crystal display device can be directly used. Generally, when the density of the spacer in the liquid crystal display device is 20 pieces/mm² to 200 pieces/mm², a fixed distance of the substrates can be held.

Thus, the orientation film and a seal pattern are provided and the spacer is provided for any of the active matrix substrate and the counter substrate; thereafter, these substrates are pasted to each other to manufacture a liquid crystal display device.

Next, the liquid crystal composition 209 is explained. The liquid crystal composition 209 is a composite of a nematic liquid crystal and an inert fluid containing fluorine ($C_mF_n$ or $C_mF_nO$ (n and m are natural numbers)), and the liquid crystal composition shown in Embodiment Mode 1 can be used.

The nematic liquid crystal can be formed from a biphenyl-based material, a terphenyl-based material, a phenyl cyclohexane-based material, a pyrimidine-based material, a fluorine-based material, a tolan-based material, an ester-based material, or the like. The amount of the inert fluid containing fluorine may be approximately 20 wt % to 30 wt % with respect to the amount of the liquid crystal composition. If the inert fluid containing fluorine is added too much, the ratio of the nematic liquid crystal is reduced and unevenness is generated when panel display is carried out. If the inert fluid containing fluorine is added little, the effect cannot be achieved.

A method of mixing the nematic liquid crystal and the inert fluid containing fluorine ($C_mF_n$ or $C_mF_nO$ (n and m are natural numbers)) is explained. In this embodiment mode, these materials are mixed and stirred for one hour while heated at a transition point (NI point) or more of isotropic phase-nematic phase of the nematic liquid crystal. The nematic liquid crystal and the inert fluid containing fluorine are mixed together by the stir at a transition point (NI point) or more of isotropic phase-nematic phase. At this time, the stir is desirably conducted around a transition point (NI point) of isotropic phase-nematic phase. If the temperature is too high, characteristics of the nematic liquid crystal are changed.

The liquid crystal composition 209 is injected into a liquid crystal cell formed of the substrates 201 and 202 at a temperature higher than a transition point (NI point) of isotropic phase-nematic phase of the nematic liquid crystal utilizing capillary phenomenon. Also in this case, the injection is desirably conducted around a transition point (NI point) of isotropic phase-nematic phase, and if the temperature is too high, characteristics of the nematic liquid crystal are changed. The injection may be conducted by a vacuum injection method. When an oriented state after the injection is verified by being interposed between polarizing plates above a backlight, a state of separation cannot be verified.

In accordance with the above steps, a liquid crystal electro-optical device with high response speed composed of a mixture of a nematic liquid crystal and an inert fluid containing fluorine ($C_mF_n$ or $C_mF_nO$ (n and m are natural numbers)), can be manufactured.

In this embodiment mode, an active matrix liquid crystal display device is explained as an example; however, the invention can be applied to a simple matrix liquid crystal display device.

The liquid crystal composition 209 used in this embodiment mode can be applied to a liquid crystal display device manufactured by a manufacturing method using a drop injection method.

Embodiment 1

Hereinafter, a method of manufacturing a liquid crystal display device is shown.

A transparent conductive film (Indium Tin Oxide (hereinafter, referred to as ITO)) is formed in 100 nm thick by a sputtering method over a glass substrate. After the transparent conductive film is applied a resist and the resist is temporary baked, the resist was exposed to light using an electrode mask and developed by wet etching. The transparent conductive film (ITO) was etched by wet etching, and the resist was removed with a peeling solution. After removing the resist, the transparent conductive film (ITO) was baked at 250° C. for one hour.

The glass substrate provided with the electrode of the transparent conductive film (ITO) was cleaned. A polyimide resin was printed by relief printing so as to be approximately 40 nm in thick, and the polyimide resin was baked at 200° C. for 90 minutes. After the baking, orientation treatment of the polyimide resin was conducted by a rubbing method, and the glass substrate was cleaned.

A pattern was formed from a heat curable seal material mixed with a gap holding material of 2.2 μm using a dispenser over a glass substrate provided with the electrode of the transparent conductive film (ITO) so as to surround the exterior of the electrode.

Wet type spraying was conducted using a spinner by mixing a spherical spacer of 2 μm in isopropyl alcohol over another glass substrate provided with the electrode of the transparent conductive film (ITO).

An ultraviolet curable seal material was dropped in the opposite angle of the glass substrate to which the spacer is sprayed and the glass substrate was pasted to the glass substrate provided with the pattern formed from the heat curable seal material. Pressing was conducted with 1.0 kgf/cm$^2$ pressure for 15 minutes, and ultraviolet light irradiation was conducted for 1 minute to cure the ultraviolet curable seal material. After the pressing, thermal pressing was conducted with 1.0 kgf/cm$^2$ pressure to cut out the pasted substrates in a panel size.

TL215 manufactured by Merck, which is a nematic liquid crystal, and FLUORINERT (registered trademark) FC-43 manufactured by Sumitomo 3M, which is an inert fluid containing fluorine, were used in manufacturing a liquid crystal composition. The property of the nematic liquid crystal TL215 is as follows: a value Δn of the anisotropy of refractive index is approximately 0.2 and dielectric constant is 8.5. The property of FLUORINERT (registered trademark) FC-43 is as follows: boiling point is 174° C., melting point is −50° C., density is 1.88 kg/m$^3$, and kinematic viscosity is 2.8 cSt. The FLUORINERT (registered trademark) FC-43 was mixed with the nematic liquid crystal TL215 in the proportion of 0 wt %, 30 wt %, and 60 wt %, and a stir was conducted for one hour while heat is applied at 90° C. so that the liquid crystal material becomes isotropic phase (liquid) state, accordingly, the liquid crystal composition was obtained.

The liquid crystal composition of the nematic liquid crystal and the inert fluid containing fluorine was injected into the cut panel while heated at 90° C. above a hot plate.

A liquid crystal electro-optical device having a simple structure was manufactured by connecting a lead wire to a cell in which the liquid crystal composition of the nematic liquid crystal TL215 and the FLUORINERT (registered trademark) FC-43 was injected (FIGS. 1A and 1B).

Voltage was applied to the lead wire in the state where the cell in which the liquid crystal composition was injected was interposed between polarizing plates disposed in crossed nicols by using a polarizing microscope, and thereby response of the liquid crystal was observed using an oscilloscope. Voltage having a rectangular wave of 0 V to 10 V and frequency of 0.1 Hz was applied using an arbitrary waveform generator. FIG. 3 shows a relation between response time of liquid crystal composition and the ratio of the FLUORINERT (registered trademark) FC-43 added to the nematic liquid crystal. A vertical axis indicates response time (ms) of the liquid crystal composition, and a horizontal axis indicates ratio (wt %) of the FLUORINERT (registered trademark) FC-43 added to the nematic liquid crystal. It is to be noted that "rising response time" refers to response time which is required when display is switched from an OFF state to an ON state, and "falling response time" refer to response time which is required when display is switched from an ON state to an OFF state. "AVE." shown in FIG. 3 refers to average time of the rising response time and the falling response time. Accordingly, it can be verified that the response speed of the liquid crystal composition added with the FLUORINERT (registered trademark) FC-43 is inclined to be faster with respect to the response speed of the nematic liquid crystal TL215 (nematic liquid crystal TL215 at a ratio of 0 wt %, namely pure nematic liquid crystal TL215).

The transition point (NI point) of isotropic phase-nematic phase of the nematic liquid crystal TL215 was 83.3° C., and the transition point (NI point) of isotropic phase-nematic phase of the liquid crystal composition added with the FLUORINERT (registered trademark) FC-43 was 83.5° C. at 30 wt % and 83.3° C. at 60 wt %. Accordingly, it can be verified that the transition point (NI point) of isotropic phase-nematic phase is not changed even though the amount of the FLUORINERT (registered trademark) FC-43 to be added is increased.

Next, voltage holding rate was measured.

The pulse of 64 μsec and 10 V was applied to the liquid cell per 30 msec using a field effect transistor, and the reduction rate of the electric potential of the liquid crystal electro-optical device cell at the time was obtained from an effective value to obtain voltage holding rate. Although the amount of the FLUORINERT (registered trademark) FC-43 to be added was increased, the voltage holding rate was 98% to 99% with respect to voltage holding rate 99% of the nematic liquid crystal TL215, which was not so much changed.

Embodiment 2

A liquid crystal electro-optical device of Embodiment 2 was manufactured in the similar way as in Embodiment 1 except that FLUORINERT (registered trademark) FC-70 manufactured by Sumitomo 3M, which is an inert fluid containing fluorine, is used instead of FLUORINERT (registered trademark) FC-43 used in Embodiment 1 (FIGS. 1A and 1B). The property of FLUORINERT (registered trademark) FC-70 is as follows: boiling point is 215° C., melting point is −25° C., density is 1.94 kg/m$^3$, and kinematic viscosity is 14.0 cSt.

Figure 4:
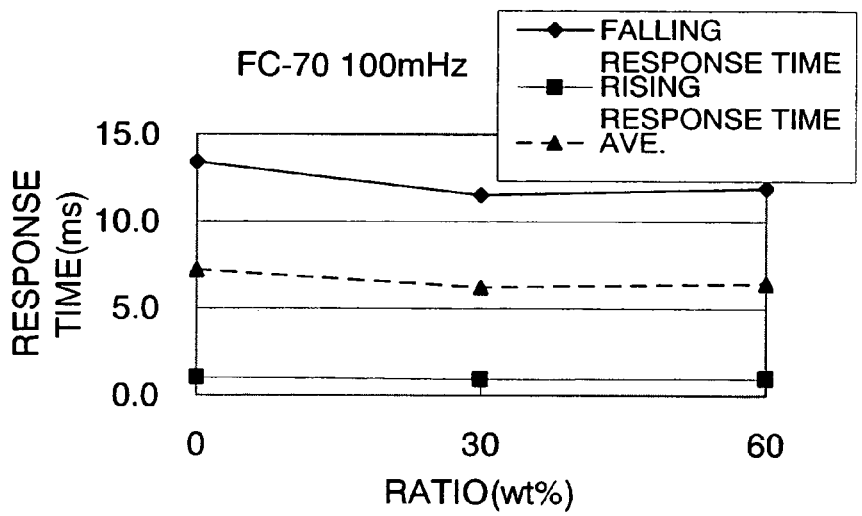
FIG. 4 is a view showing characteristics of response time with respect to the amount of an inert fluid containing fluorine to be added of a liquid crystal display device in Embodiment 2 according to the invention.

Voltage was applied to the lead wire in the state where the cell in which the liquid crystal composition was injected was interposed between polarizing plates disposed in crossed nicols by using a polarizing microscope, and thereby response of the liquid crystal was observed using an oscilloscope. Voltage having a rectangular wave of 0 V to 10 V and frequency of 0.1 Hz was applied using an arbitrary waveform generator. FIG. 4 shows a relation between response time of liquid crystal composition and ratio of the FLUORINERT (registered trademark) FC-70 added to the nematic liquid crystal. A vertical axis indicates response time (ms) of the liquid crystal composition, and a horizontal axis indicates ratio (wt %) of the FLUORINERT (registered trademark) FC-70 added to the nematic liquid crystal. Accordingly, it can be verified that the response speed of the liquid crystal composition added with the FLUORINERT (registered trademark) FC-70 is inclined to be faster with respect to the response speed of the nematic liquid crystal TL215 (nematic liquid crystal TL215 at a ratio of 0 wt %, namely pure nematic liquid crystal TL215).

The transition point (NI point) of isotropic phase-nematic phase of the nematic liquid crystal TL215 was 83.3° C., and the transition point (NI point) of isotropic phase-nematic phase of the liquid crystal composition added with the FLUORINERT (registered trademark) FC-70 was 83.5° C.

at 30 wt % and 83.7° C. at 60 wt %. Accordingly, it can be verified that the transition point (NI point) of isotropic phase-nematic phase is not changed even though the amount of the FLUORINERT (registered trademark) FC-70 to be added is increased.

Next, voltage holding rate was measured.

The pulse of 64 μsec and 10 V was applied to the liquid cell per 30 msec using a field effect transistor, and the reduction rate of the electric potential of the liquid crystal electro-optical device cell at the time was obtained from an effective value to obtain voltage holding rate. Although the amount of the FLUORINERT (registered trademark) FC-70 to be added was increased, the voltage holding rate was 98% to 99% with respect to voltage holding rate 99% of the nematic liquid crystal TL215, which was not so much changed.

Embodiment 3

A liquid crystal electro-optical device of Embodiment 3 was manufactured in the similar way as in Embodiment 1 except that FLUORINERT (registered trademark) FC-77 manufactured by Sumitomo 3M, which is an inert fluid containing fluorine, was used instead of FLUORINERT (registered trademark) FC-43 used in Embodiment 1 (FIGS. 1A and 1B). The property of FLUORINERT (registered trademark) FC-77 is as follows: boiling point is 97° C., melting point is −110° C., density is 1.78 kg/m$^3$, and kinematic viscosity is 0.8 cSt.

Figure 5:
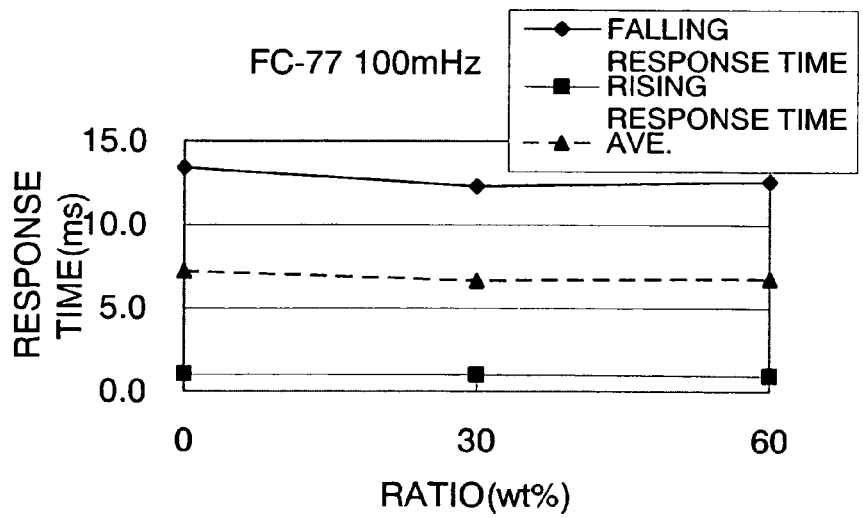
FIG. 5 is a view showing characteristics of response time with respect to the amount of an inert fluid containing fluorine to be added of a liquid crystal display device in Embodiment 3 according to the invention.

Voltage was applied to the lead wire in the state where the cell in which the liquid crystal composition was injected was interposed between polarizing plates disposed in crossed nicols by using a polarizing microscope, and thereby response of the liquid crystal was observed using an oscilloscope. Voltage having a rectangular wave of 0 V to 10 V and frequency of 0.1 Hz was applied using an arbitrary waveform generator. FIG. 5 shows a relation between response time of liquid crystal composition and ratio of the FLUORINERT (registered trademark) FC-77 added to the nematic liquid crystal. A vertical axis indicates response time (ms) of the liquid crystal composition, and a horizontal axis indicates ratio (wt %) of the FLUORINERT (registered trademark) FC-77 added to the nematic liquid crystal. Accordingly, it can be verified that the response speed of the liquid crystal composition added with the FLUORINERT (registered trademark) FC-77 is inclined to be faster with respect to the response speed of the nematic liquid crystal TL215 (nematic liquid crystal TL215 at a ratio of 0 wt %, namely pure nematic liquid crystal TL215).

The transition point (NI point) of isotropic phase-nematic phase of the nematic liquid crystal TL215 was 83.3° C., and the transition point (NI point) of isotropic phase-nematic phase of the liquid crystal composition added with the FLUORINERT (registered trademark) FC-77 was 82.8° C. at 30 wt % and 83.3° C. at 60 wt %. Accordingly, it can be verified that the transition point (NI point) of isotropic phase-nematic phase is not changed even though the amount of the FLUORINERT (registered trademark) FC-77 to be added is increased.

Next, voltage holding rate was measured.

The pulse of 64 μsec and 10 V was applied to the liquid cell per 30 msec using a field effect transistor, and the reduction rate of the electric potential of the liquid crystal electro-optical device cell at the time was obtained from an effective value to obtain voltage holding rate. Although the amount of the FLUORINERT (registered trademark) FC-77 to be added was increased, the voltage holding rate was 98% to 99% with respect to voltage holding rate 99% of the nematic liquid crystal TL215, which was not so much changed.

Embodiment 4

A liquid crystal electro-optical device of Embodiment 4 was manufactured in the similar way as in Embodiment 1 except that a nematic liquid crystal (ZLI4792 manufactured by Merck) was used instead of a nematic liquid crystal (TL215 manufactured by Merck) used in Embodiment 1, and FLUORINERT (registered trademark) FC-43 was mixed in the proportion of 0 wt %, 10 wt %, 20 wt %, 30 wt %, 40 wt %, 50 wt %, and 60 wt % with respect to the nematic liquid crystal ZLI4792 (FIGS. 1A and 1B). The property of the nematic liquid crystal ZLI4792 is as follows: a value Δn of the anisotropy of refractive index is approximately 0.09 and dielectric constant is 5.2.

Figure 6:
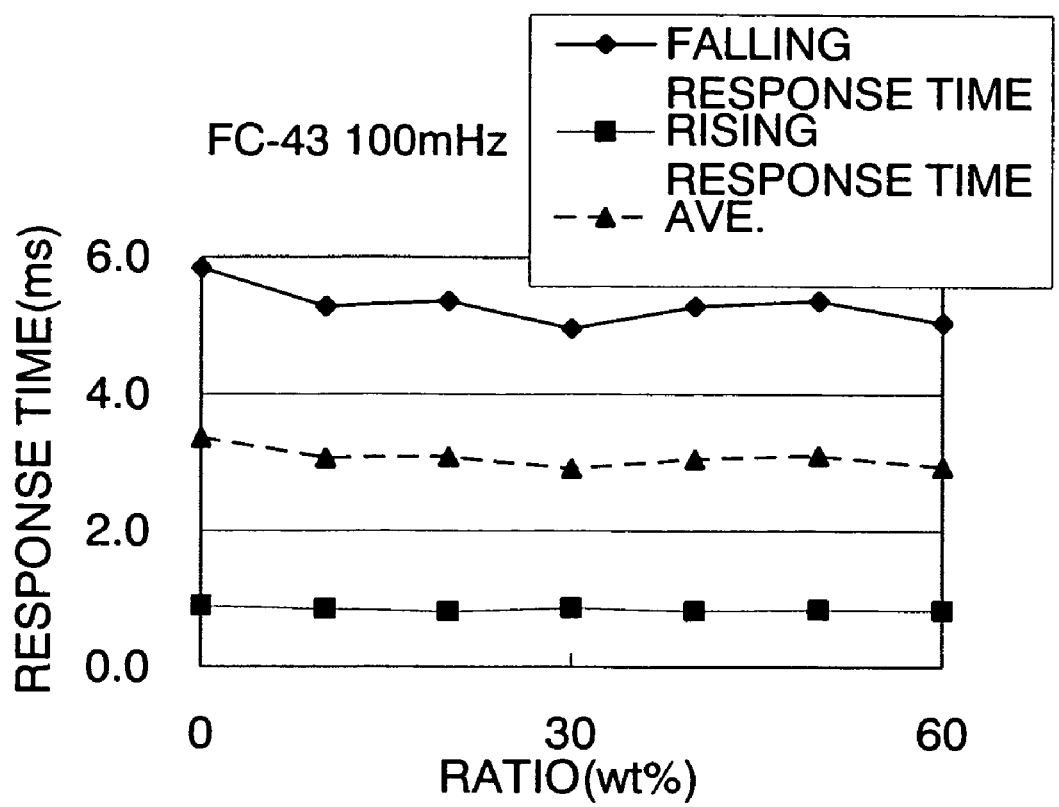
FIG. 6 is a view showing characteristics of response time with respect to the amount of an inert fluid containing fluorine to be added of a liquid crystal display device in Embodiment 4 according to the invention.

Voltage was applied to the lead wire in the state where the cell in which the liquid crystal composition was injected was interposed between polarizing plates disposed in crossed nicols by using a polarizing microscope, and thereby response of the liquid crystal was observed using an oscilloscope. Voltage having a rectangular wave of 0 V to 10 V and frequency of 0.1 Hz was applied using an arbitrary waveform generator. FIG. 6 shows a relation between response time of liquid crystal composition and ratio of the FLUORINERT (registered trademark) FC-43 added to the nematic liquid crystal. A longitudinal axis indicates response time (ms) of the liquid crystal composition, and a horizontal axis indicates ratio (wt %) of the FLUORINERT (registered trademark) FC-43 added to the nematic liquid crystal. Accordingly, it can be verified that the response speed of the liquid crystal composition added with the FLUORINERT (registered trademark) FC-43 is inclined to be faster with respect to the response speed of the nematic liquid crystal ZLI4792 (nematic liquid crystal ZLI4792 at a ratio of 0 wt %, namely pure nematic liquid crystal TL215).

The transition point (NI point) of isotropic phase-nematic phase of the nematic liquid crystal ZLI4792 was 97.6° C., and the transition point (NI point) of isotropic phase-nematic phase of the liquid crystal composition added with the FLUORINERT (registered trademark) FC-43 was 97.5° C. at 10 wt %, 97.7° C. at 20 wt %, 97.3° C. at 30 wt %, 97.1° C. at 40 wt %, 97.4° C. at 50 wt %, and 97.1° C. at 60 wt %. Accordingly, it can be verified that the transition point (NI point) of isotropic phase-nematic phase is not changed even though the amount of the FLUORINERT (registered trademark) FC-43 to be added is increased.

Next, voltage holding rate was measured.

The pulse of 64 μsec and 10 V was applied to the liquid cell per 30 msec using a field effect transistor, and the reduction rate of the electric potential of the liquid crystal electro-optical device cell at the time was obtained from an effective value to obtain voltage holding rate. Although the amount of the FLUORINERT (registered trademark) FC-43 to be added was increased, the voltage holding rate was 98% to 99% with respect to voltage holding rate 98% of the nematic liquid crystal ZLI4792, which was not so much changed Embodiment 5

In this embodiment, a manufacturing method of a TFT provided for a pixel in the case of applying the present invention to an active matrix display device is explained.

Figure 7A:
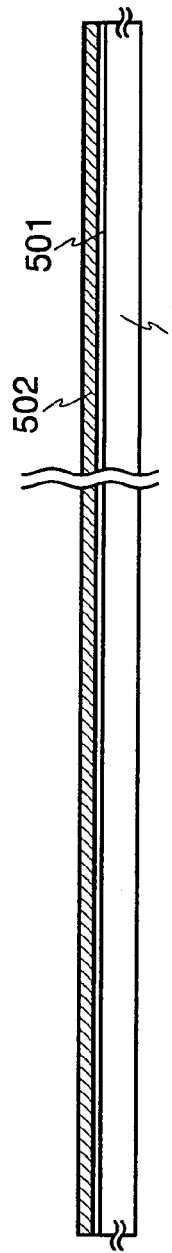
FIGS. 7A to 7D are views showing a manufacturing process of a semiconductor device.

First, as shown in FIG. 7A, a base film 501 is formed over a substrate 500. A glass substrate such as barium borosilicate glass or aluminoborosilicate glass, a quartz substrate, a stainless steel substrate, or the like can be used as the substrate 500. In addition, a substrate formed from synthetic resin having flexibility, such as acrylic or plastic typified by PET, PES, and PEN can be used.

The base film 501 is provided in order to prevent alkaline earth metal or alkali metal such as Na included in the substrate 500 from diffusing into a semiconductor film to adversely affect characteristics of a semiconductor element. Therefore, an insulating film formed from silicon nitride, silicon oxide containing nitrogen, or the like which can suppress the diffusion of alkali metal or alkaline earth metal into the semiconductor film is used. In this embodiment, a silicon oxide film containing nitrogen is formed in 10 nm to 400 nm thick (preferably 50 nm to 300 nm thick) by a plasma CVD method.

It is to be noted that the base film 501 may be a single layer of an insulating film formed from silicon nitride, silicon oxide containing nitrogen, silicon nitride containing oxygen, or the like; or a plurality of insulating films formed from silicon oxide, silicon nitride, silicon oxide containing nitrogen, silicon nitride containing oxygen, or the like which has been stacked. In the case of using a substrate containing even a small amount of alkali metal or alkaline earth metal, such as the glass substrate, the stainless steel substrate, or the plastic substrate, it is effective to provide the base film in point of preventing the diffusion of an impurity. However, when the diffusion of the impurity does not lead to a significant problem, for example when the quartz substrate is used, the base film is not necessarily provided.

Next, a semiconductor film 502 is formed over the base film 501. The film thickness of the semiconductor film 502 is set to 25 nm to 100 nm (preferably 30 nm to 60 nm). The semiconductor film 502 may be any of an amorphous semiconductor and a polycrystalline semiconductor. As the semiconductor, not only silicon (Si) but also silicon germanium (SiGe) may be used. In the case of using the silicon germanium, the concentration of germanium is preferably approximately 0.01 to 4.5 atomic %.

Figure 7B:
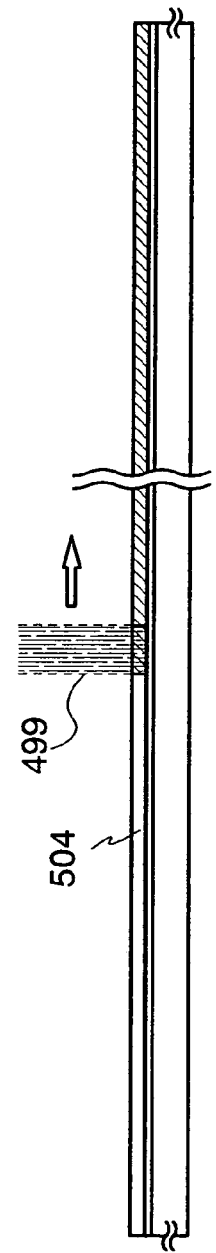

Next, as shown in FIG. 7B, the semiconductor film 502 is crystallized by being irradiated with a linear laser 499. In the case of conducting the laser crystallization, heat treatment at 500° C. for one hour may be conducted to the semiconductor film 502 before the laser crystallization in order to increase the resistance of the semiconductor film 502 against the laser.

In the laser crystallization, as a continuous wave laser or a quasi-CW (Continuous-Wave) laser, a pulsed laser having a repetition rate of 10 MHz or more, preferably, 80 MHz or more can be used.

Specifically, as the continuous wave laser, an Ar laser, a Kr laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a helium-cadmium laser, or the like is given.

As long as the pulse oscillation at a repetition rate of 10 MHz or more, preferably 80 MHz or more, if possible, a pulsed laser such as an Ar laser, a Kr laser, an excimer laser, a $CO_2$ laser, a YAG laser, a $YVO_4$ laser, a YLF laser, a $YAlO_3$ laser, a $GdVO_4$ laser, a $Y_2O_3$ laser, a ruby laser, an alexandrite laser, a Ti:sapphire laser, a copper vapor laser, or a gold vapor laser can be used as the quasi-CW laser.

Such a pulsed laser eventually shows a similar effect to that of a continuous wave laser when a repetition rate is made to be increased.

For example, in the case of using a solid-state laser capable of continuous wave oscillation, a crystal with a large grain size can be obtained by emitting a laser light of second to fourth harmonics. Typically, it is desirable to use the second harmonic (532 nm) or the third harmonic (355 nm) of a YAG laser (the fundamental wave 1064 nm). For example, a laser light emitted from a continuous wave YAG laser is converted into a harmonic by a non-linear optical element and emitted to the semiconductor film 502. The power density may be approximately in the range of 0.01 $MW/cm^2$ to 100 $MW/cm^2$ (preferably 0.1 $MW/cm^2$ to 10 $MW/cm^2$).

It is to be noted that the laser, light irradiation may be conducted in an atmosphere containing inert gas such as rare gas or nitrogen. This can suppress the roughness of the surface of the semiconductor caused by the laser light irradiation and suppress the variation in the threshold voltage due to the variation in the interface state density.

By irradiating the semiconductor film 502 with the laser light as thus described, a crystalline semiconductor film 504 in which the crystallinity has been enhanced further is formed.

Figure 7C:
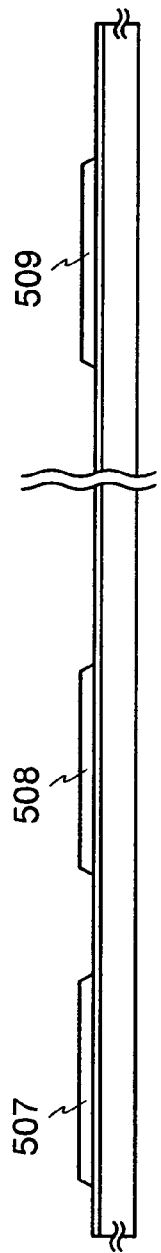

Then, as shown in FIG. 7C, the crystalline semiconductor film 504 is processed in a desired shape to form island-shaped semiconductor films 507 to 509.

Next, an impurity is introduced into the island-shaped semiconductor films in order to control a threshold value. In this embodiment, boron (B) is introduced into the island-shaped semiconductor films by doping with diborane $(B_2H_6)$.

Next, an insulating film 510 is formed so as to cover the island-shaped semiconductor films 507 to 509. As the insulating film 510, for example, silicon oxide (SiO), silicon nitride (SiN), silicon oxide containing nitrogen (SiON), or the like can be used. As the film-forming method, a plasma CVD method, a sputtering method, or the like can be used.

Next, a conductive film is processed in a desired shape after forming the conductive film over the insulating film 510 to form gate electrodes 570 to 572.

The gate electrodes 570 to 572 are formed with a single layer of a conductive film or with a structure in which two or more conductive films are stacked. In the case of stacking the two or more conductive films, the gate electrodes 570 to 572 may be formed by stacking an element selected from tantalum (Ta), tungsten (W), titanium (Ti), molybdenum (Mo), and aluminum (Al), or an alloy material or a compound material containing the above element as its main component. Alternatively, the gate electrodes may be formed using a semiconductor film typified by a polycrystalline silicon film doped with an impurity element such as phosphorus (P).

Figure 7D:
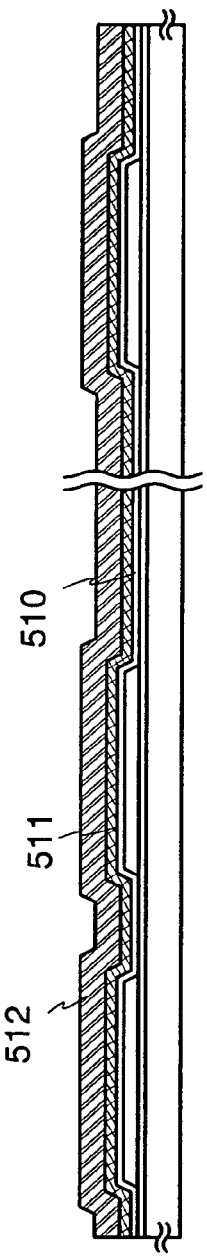

In this embodiment, the gate electrodes 570 to 572 are formed as described hereinafter. For example, a tantalum nitride (TaN) film is formed in 10 nm to 50 nm thick, for example 30 nm thick, as a first conductive film 511. Then, for example, a tungsten (W) film is formed over the first conductive film 511 in 200 nm to 400 nm thick, for example 370 nm thick, as a second conductive film 512. Thus, a multilayer film of the first conductive film 511 and the second conductive film 512 is formed to form a stacked layer of the first conductive film 511 and the second conductive film 512 (FIG. 7D).

Then, the second conductive film 512 is etched by anisotropic etching to form upper gate electrodes 560 to 562 (FIG. 8A). Then, the first conductive film 511 is etched by isotropic etching to form lower gate electrodes 563 to 565 (FIG. 8B). Accordingly, the gate electrodes 570 to 572 are formed.

The gate electrodes 570 to 572 may be formed as a part of a gate wiring, or the gate electrodes 570 to 572 may be connected to a gate wiring which is separately formed.

Then, each of the island-shaped semiconductor films 507 to 509 is doped with an impurity which imparts one conductivity (n-type or p-type conductivity) using the gate electrodes 570 to 572 or a resist patterned in a desired shape as a mask, and thereby a source region, a drain region, a low-concentration impurity region, and the like are formed.

First, phosphorus (P) is introduced into the island-shaped semiconductor films at an acceleration voltage of 60 keV to 120 keV and with a dose amount of $1\times10^{13}$ cm$^{-2}$ to $1\times10^{15}$ cm$^{-2}$ using phosphine (PH$_3$). At this introduction of the impurity, channel-forming regions 522 and 527 of n-channel TFTs 550 and 552 are formed.

In order to manufacture a p-channel TFT 551, boron (B) is introduced into the island-shaped semiconductor films at an applied voltage of 60 keV to 100 keV, for example 80 keV, and with a dose amount of $1\times10^{13}$ cm$^{-2}$ to $5\times10^{15}$ cm$^{-2}$, for example $3\times10^{15}$ cm$^{-2}$ using diborane (B$_2$H$_6$). With this step, a source region or a drain region 523 of the p-channel TFT is formed, and a channel-forming region 524 is formed at this introduction of the impurity (FIG. 8C).

Next, the insulating film 510 is processed in a desired shape to form gate insulating films 580 to 582.

Figure 9A:
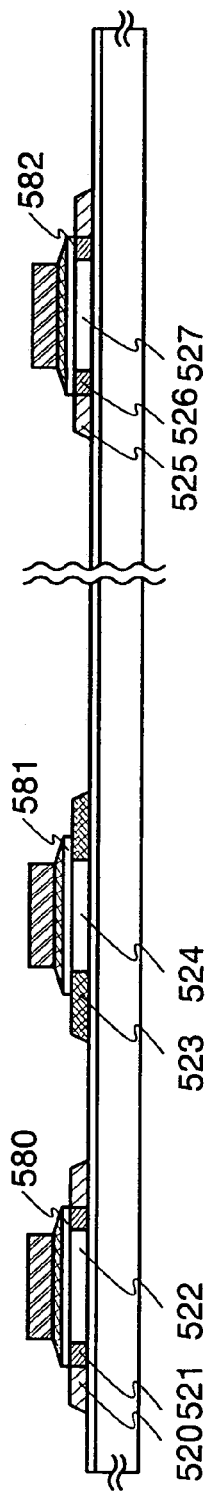
FIGS. 9A to 9C are views showing a manufacturing process of a semiconductor device.

After forming the gate insulating films 580 to 582, phosphorus (P) is introduced into the island-shaped semiconductor films to be the n-channel TFTs 550 and 552 at an applied voltage of 40 keV to 80 keV, for example 50 keV, and with a dose amount of $1.0\times10^{15}$ cm$^{-2}$ to $2.5\times10^{16}$ cm$^{-2}$, for example $3.0\times10^{15}$ cm$^{-2}$, using phosphine (PH$_3$). Accordingly, low-concentration impurity regions 521 and 526 of the n-channel TFT and source regions or drain regions 520 and 525 are formed (FIG. 9A).

In this embodiment, phosphorus (P) is included in each of the source regions or drain regions 520 and 525 of the n-channel TFTs 550 and 552 at a concentration of $1\times10^{19}$ cm$^{-3}$ to $5\times10^{21}$ cm$^{-3}$. Moreover, phosphorus (P) is included in each of the low-concentration impurity regions 521 and 526 of the n-channel TFTs 550 and 552 at a concentration of $1\times10^{18}$ cm$^{-3}$ to $5\times10^{19}$ cm$^{-3}$. Further, boron (B) is included in the source or drain region 523 of the p-channel TFT 551 at a concentration of $1\times10^{19}$ cm$^{-3}$ to $5\times10^{21}$ cm$^{-3}$.

Figure 9B:
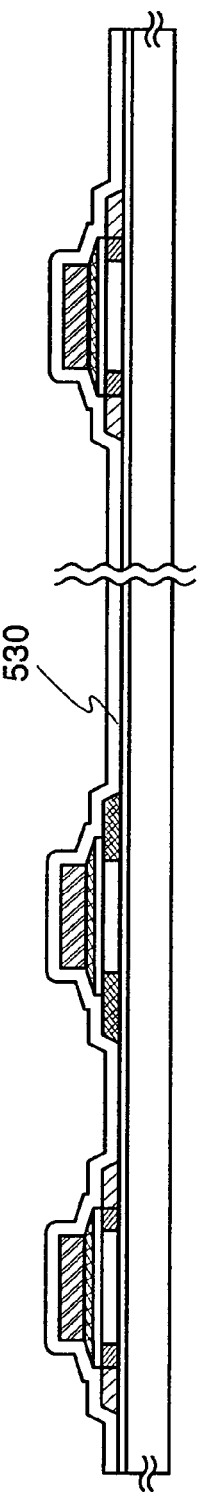

Next, a first interlayer insulating film 530 is formed covering the island-shaped semiconductor films 507 to 509 and the gate electrodes 570 to 572 (FIG. 9B).

As the first interlayer insulating film 530, an insulating film containing silicon, for example a silicon oxide film (SiO), a silicon nitride film (SiN), a silicon oxide film containing nitrogen (SiON), or a multilayer film thereof is formed by a plasma CVD method or a sputtering method. Of course, the first interlayer insulating film 530 is not limited to a silicon oxide film containing nitrogen, a silicon nitride film, or a multilayer film thereof, and another insulating film containing silicon may be formed in a single layer or multilayer structure.

In this embodiment, after introducing the impurity, a silicon oxide film containing nitrogen (SiON film) is formed in 50 nm thick by a plasma CVD method, and then the impurity is activated by laser irradiation or a RTA method. Alternatively, after forming the silicon oxide film containing nitrogen, heat treatment may be conducted at 550° C. for four hours in a nitrogen atmosphere to activate the impurity.

Next, a silicon nitride film (SiN film) is formed in 50 nm thick by a plasma CVD method, and then a silicon oxide film containing nitrogen (SiON film) is formed in 600 nm thick. The multilayer film of the silicon oxide film containing nitrogen, the silicon nitride film, and the silicon oxide film containing nitrogen corresponds to the first interlayer insulating film 530.

Subsequently, hydrogenation is conducted by heating the whole at 410° C. for one hour to release hydrogen from the silicon nitride film.

Next, a second interlayer insulating film 531 serving as a planarizing film is formed covering the first interlayer insulating film 530.

As the second interlayer insulating film 531, a photosensitive or non-photosensitive organic material (polyimide, acrylic, polyamide, polyimide amide, resist, or benzocyclobutene), siloxane, and a multilayer structure thereof can be used. Siloxane is composed of a skeleton formed by the bond of silicon (Si) and oxygen (O), in which an organic group containing at least hydrogen (such as alkyl group or aromatic hydrocarbon) is included as a substituent. Alternatively, a fluoro group may be used as the substituent. Further alternatively, a fluoro group and an organic group containing at least hydrogen may be used as the substituent. As the organic material, positive photosensitive organic resin or negative photosensitive organic resin can be used.

In this embodiment, siloxane is formed by a spin coating method as the second interlayer insulating film 531.

The first interlayer insulating film 530 and the second interlayer insulating film 531 are etched to form a contact hole which reaches the island-shaped semiconductor films 507 to 509 in the first interlayer insulating film 530 and the second interlayer insulating film 531.

A third interlayer insulating film may be formed over the second interlayer insulating film 531 and a contact hole may be formed in the first, second, and third interlayer insulating films. As the third interlayer insulating film, a film which is more difficult to transmit moisture, oxygen, and the like than another insulating film is used. Typically, a silicon nitride film, a silicon oxide film, a silicon nitride film containing oxygen (a SiNO film (composition ratio N>O) or a SiON film (composition ratio N<O)), a thin film mainly containing carbon (for example, a DLC film or a CN film), or the like obtained by a sputtering method or a CVD method can be used.

A third conductive film is formed over the second interlayer insulating film 531 through the contact hole, and the third conductive film is processed in a desired shape to form electrodes or wirings 540 to 544.

In this embodiment, a metal film is used as the third conductive film. As the metal film, a film containing an element of aluminum (Al), titanium (Ti), molybdenum (Mo), tungsten (W), or silicon (Si), or an alloy film using these elements may be used. In this embodiment, a titanium film (Ti), a titanium nitride film (TiN), a silicon-aluminum alloy film (Al—Si), and a titanium film (Ti) are formed in thicknesses of 60 nm, 40 nm, 300 nm, and 100 nm, respectively, and etched into desired shapes to form the electrodes or wirings 540 to 544.

These electrodes or wirings 540 to 544 may be formed from an aluminum alloy film containing carbon and at least one element of nickel, cobalt, and iron. Such an aluminum alloy film can prevent the interactive diffusion of silicon and aluminum even when the aluminum alloy film contacts silicon. Further, since an oxidation-reduction reaction does not occur even when such an aluminum alloy film contacts a transparent conductive film such as an ITO (Indium Tin Oxide) film, both can be directly contacted. Moreover, such an aluminum alloy film has low specific resistance and high heat resistance, and thereby is effective for a wiring material.

The electrodes or wirings 540 to 544 may be formed by simultaneously forming an electrode and a wiring. Alternatively, an electrode and a wiring which are formed separately may be connected.

Figure 9C:
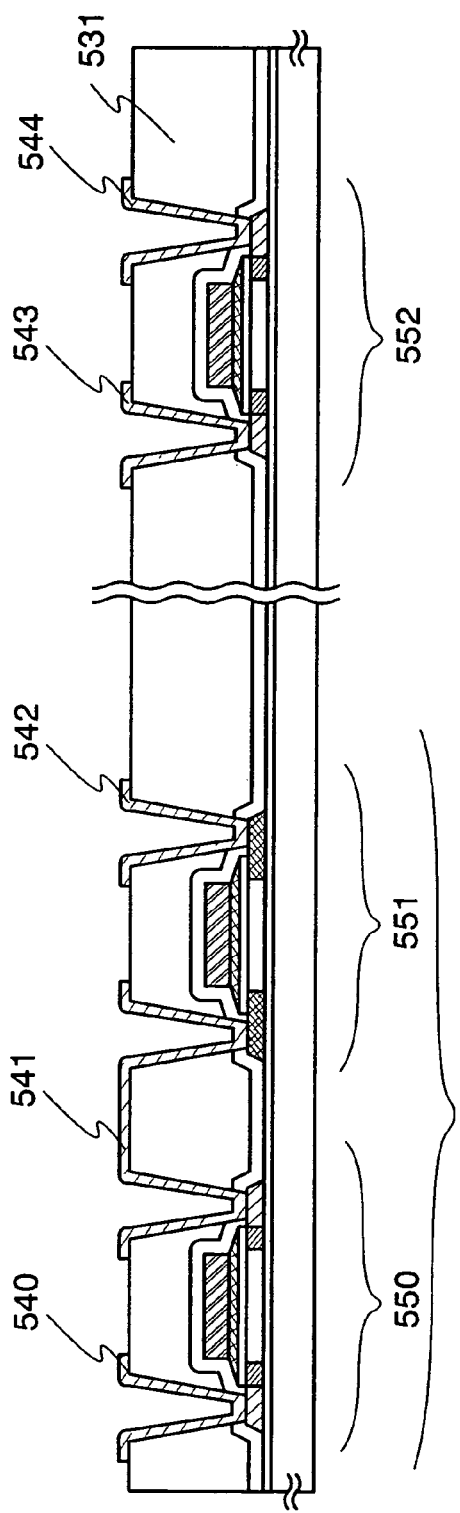

According to a series of the steps, a semiconductor device including a CMOS circuit 553 having the n-channel TFT 550 and the p-channel TFT 551, and the n-channel TFT 552 can be formed (FIG. 9C). The method of manufacturing a semiconductor device according to the invention is not limited to the above-mentioned manufacturing steps after forming the island-shaped semiconductor films.

Embodiment 6

In this embodiment, an example of manufacturing a liquid crystal display device (Liquid Crystal Display (LCD)) using the present invention is shown.

A method of manufacturing a display device which is explained in this embodiment is a method of manufacturing a pixel portion including a pixel TFT and a TFT of a driver circuit portion provided in the periphery of the pixel portion simultaneously. As for a driver circuit, a CMOS circuit which is a basic unit is shown for ease of explanation.

First, the steps up to forming electrodes or wirings 540 to 544 shown in FIG. 9C are conducted based on Embodiment 5. Note that the same reference numerals denote the same parts or parts having the same function as that the above embodiment.

Next, a third interlayer insulating film 610 is formed over a second interlayer insulating film 531 and the electrodes or wirings 540 to 544. The third interlayer insulating film 610 can be formed from the similar material as that of the second interlayer insulating film 531.

Then, a resist mask is formed using a photo mask, and a part of the third interlayer insulating film 610 is removed by dry etching and opened (contact hole is formed). In forming this contact hole, carbon tetrafluoride ($CF_4$), oxygen ($O_2$), and helium (He) are used as etching gas with the flow rate of $CF_4$, $O_2$, and He for 50 sccm, 50 sccm, and 30 sccm, respectively. The bottom portion of the contact hole reaches the electrode or wiring 544.

Figure 10:
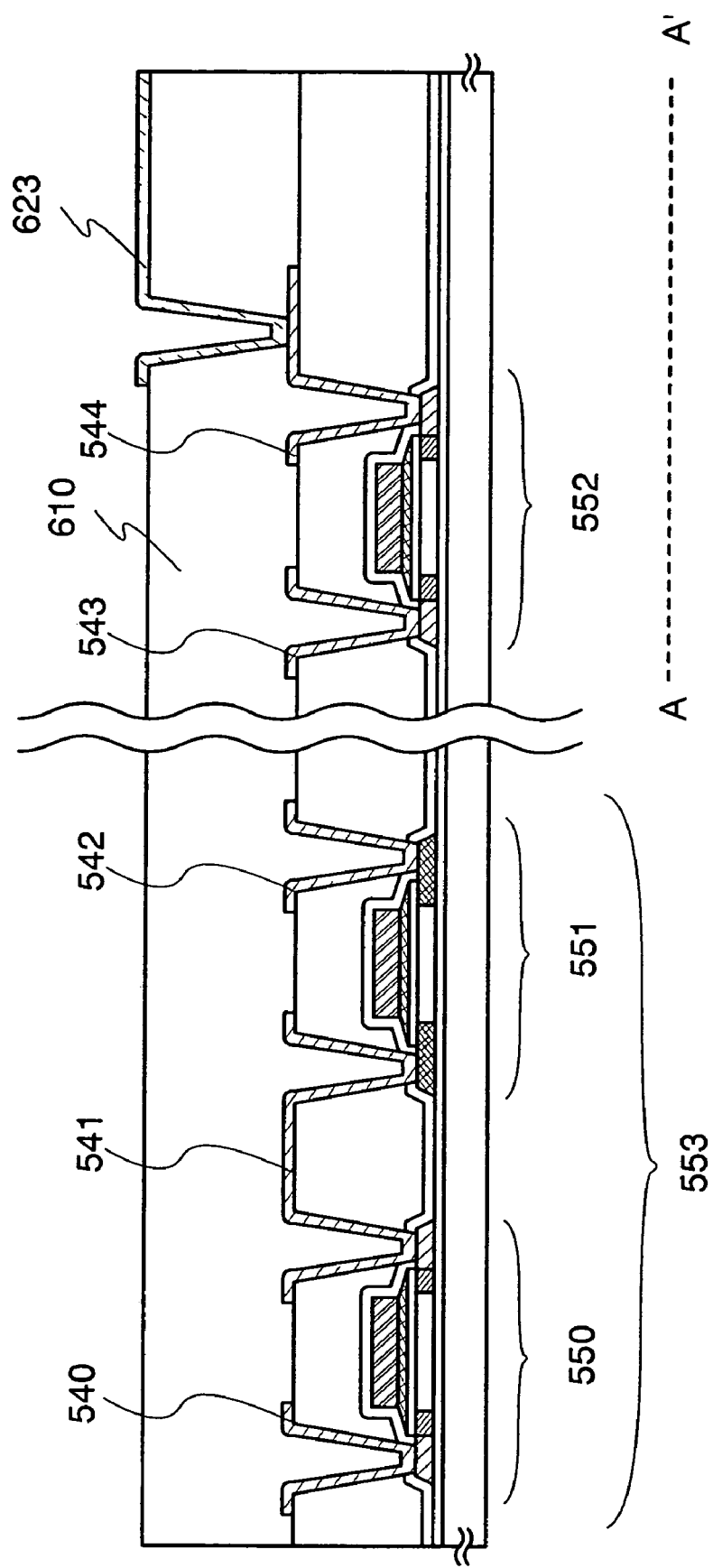
FIG. 10 is a view showing a manufacturing process of a liquid crystal display device according to the invention.

Next, after removing the resist mask, a second conductive film is formed all over the surface. Then, the second conductive film is processed in a desired shape using a photo mask, and thereby a pixel electrode 623 to be electrically connected to the electrode or wiring 544 is formed (FIG. 10). In this embodiment, since a reflection type liquid crystal display panel is manufactured, the pixel electrode 623 may be formed from a metal material having light-reflectivity such as Ag (silver), Au (gold), Cu (copper), W (tungsten), or Al (aluminum) by a sputtering method.

In the case of manufacturing a transmission-type liquid crystal display panel, the pixel electrode 623 is formed using a transparent conductive film such as indium tin oxide (ITO), indium tin oxide containing silicon oxide, zinc oxide (ZnO), or tin oxide ($SnO_2$).

Figure 12:
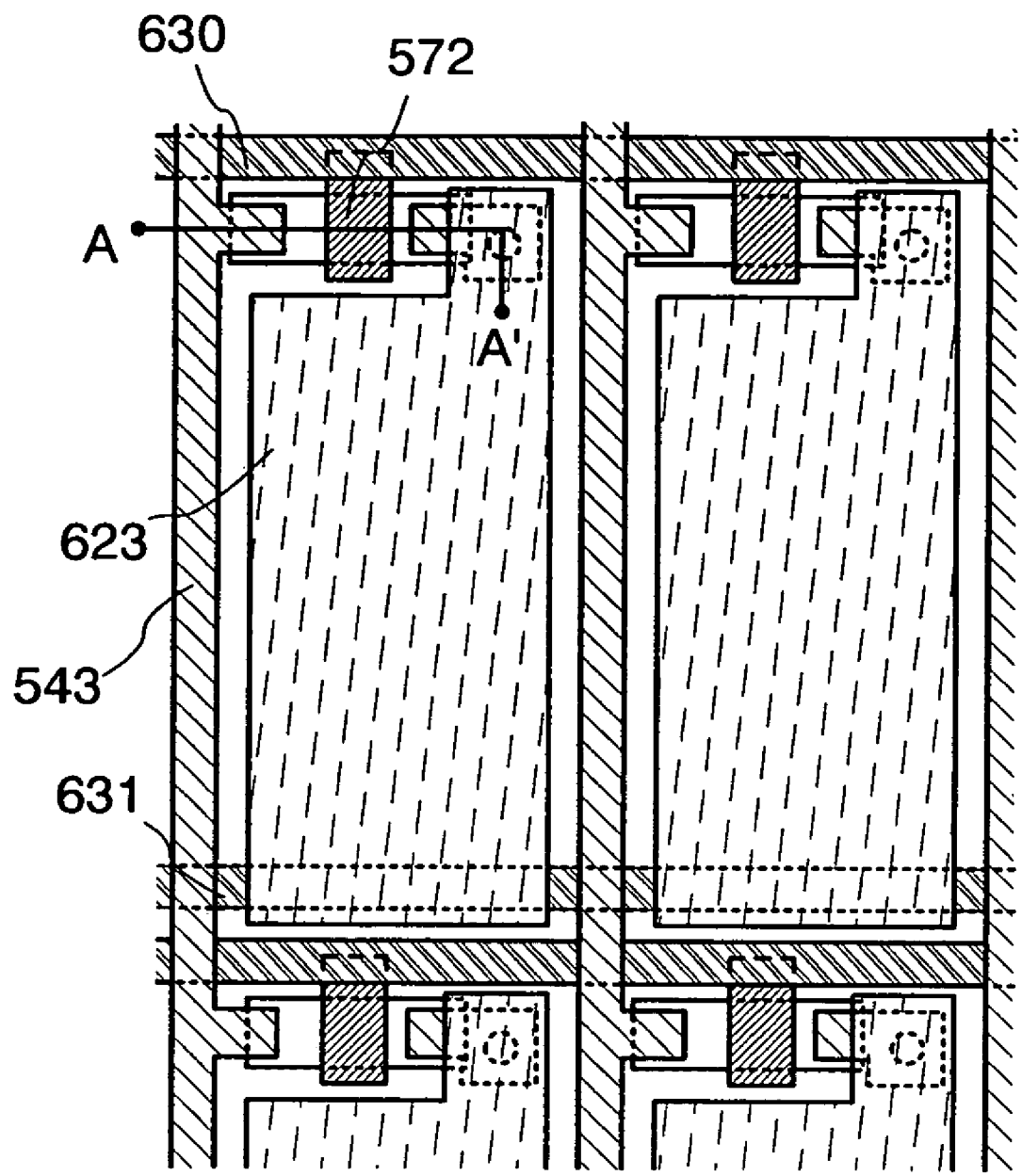
FIG. 12 is a view showing one pixel of a liquid crystal display device according to the invention.

FIG. 12 is a top view in which a part of the pixel portion 650 including a pixel TFT is magnified. In FIG. 12, the drawing taken along a solid line A-A' corresponds to a cross section of a pixel portion in FIG. 10 and the parts corresponding to those in FIG. 10 are denoted by the same reference numerals.

As shown in FIG. 12, a gate electrode 572 is connected to a gate wiring 630. An electrode 543 is integrated with a source wiring.

A capacitor wiring 631 is provided, and a storage capacitor is formed of a pixel electrode 623 and the capacitor wiring 631 which overlaps the pixel electrode by using a first interlayer insulating film 530 as a dielectric.

In this embodiment, the second interlayer insulating film 531 and the third interlayer insulating film 610 are etched in the region where the pixel electrode 623 and the capacitor wiring 631 overlap, and the storage capacitor is formed of the pixel electrode 623, the first interlayer insulating film 530, and the capacitor wiring 631. However, if the second interlayer insulating film 531 and the third interlayer insulating film 610 can also be used as the dielectric, the second interlayer insulating film 531 and the third interlayer insulating film 610 are not required to be etched. In this case, the first interlayer insulating film 530, the second interlayer insulating film 531, and the third interlayer insulating film 610 serve as the dielectric. Alternatively, only the third interlayer insulating film 610 may be etched and the first interlayer insulating film 530 and the second interlayer insulating film 531 may be used as the dielectric.

With the above steps, a TFT substrate of a liquid crystal display device in which a top-gate pixel TFT 552, a CMOS circuit 553 including a top-gate n-channel TFT 550 and a top-gate p-channel TFT 551, and the pixel electrode 623 are formed over a substrate 500 is completed. Although a top-gate TFT is formed in this embodiment, a bottom-gate TFT can be appropriately used.

Figure 11:
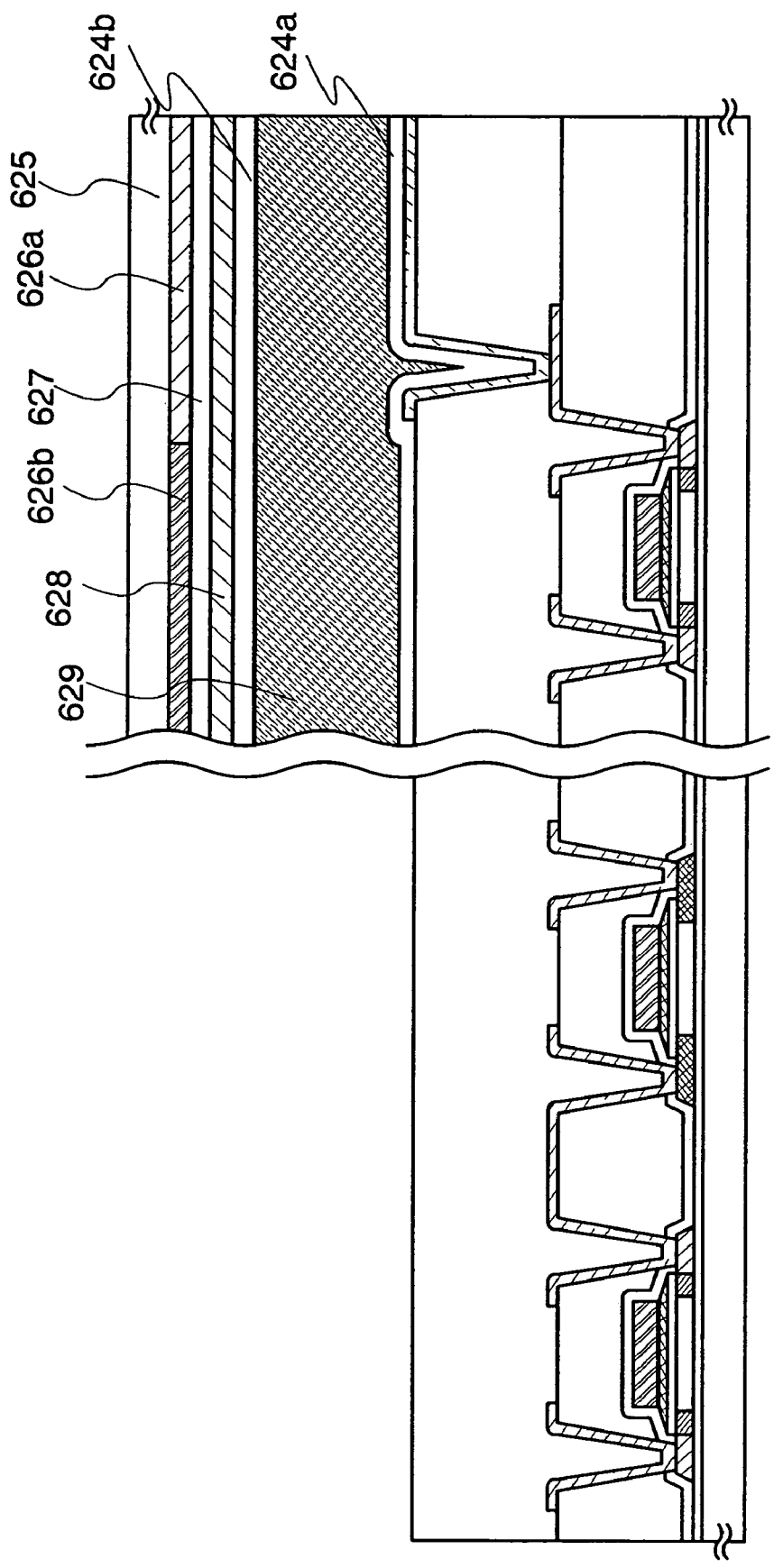
FIG. 11 is a view showing a manufacturing process of a liquid crystal display device according to the invention.

Next, an orientation film 624a is formed so as to cover the pixel electrode 623. The orientation film 624a may be formed by a droplet discharge method, a screen printing method, or an off-set printing method. After that, rubbing treatment is conducted to the surface of the orientation film 624a (FIG. 11).

Figure 13A:
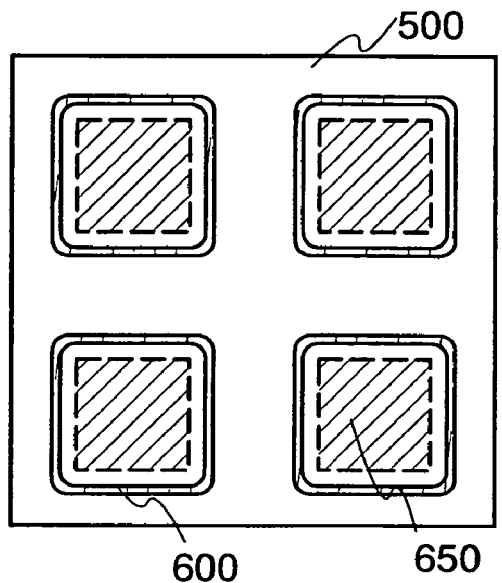
FIGS. 13A to 13D are views showing a manufacturing process of a liquid crystal display device according to the invention.

Then, a color filter including a colored layer 626a, a light shielding layer (black matrix) 626b, and an overcoat layer 627 is provided for a counter substrate 625. Moreover, a counter electrode 628 including a transparent electrode or a reflective electrode is formed, and then an orientation film 624b is formed thereover. Next, a seal material 600 which is a closed pattern is formed by a droplet discharge method so as to surround a region overlapping the pixel portion 650 including the pixel TFT (FIG. 13A). Since a liquid crystal is dropped here, an example of drawing the seal material 600 of the closed pattern is shown; however, a dip method (lifting method) may also be employed in which a liquid crystal is injected using a capillary phenomenon after providing a seal pattern having an opening portion and pasting the substrate 500.

Figure 13B:
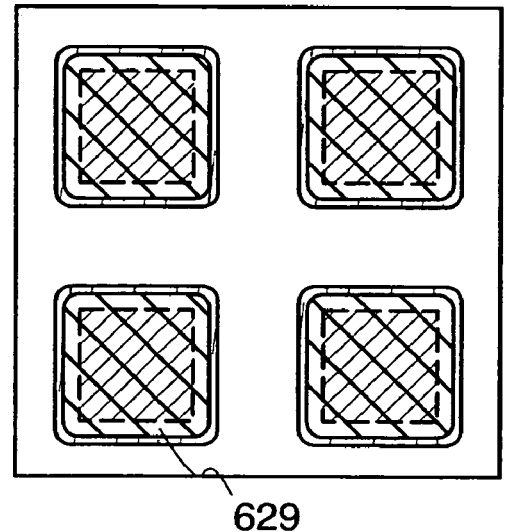
Figure 13C:
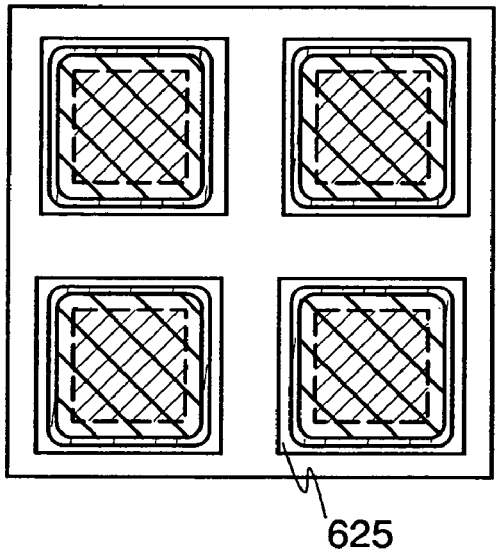

Next, a liquid crystal composition 629 is dropped under low pressure so that a bubble does not enter (FIG. 13B), and then both substrates 500 and 625 are pasted (FIG. 13C). A liquid crystal is dropped once or plural times within the seal pattern of a closed loop. As the liquid crystal composition, a liquid crystal composition shown in Embodiments 1 to 4 may be used. As an orientation mode of the liquid crystal composition 629, a TN mode in which an arrangement of liquid crystal molecules is twisted for 90° from the incidence of light toward the emission of light is employed. The substrates are pasted so that the rubbing directions of the substrates intersect.

The distance between a pair of substrates may be held by spraying spherical spacers, forming columnar spacers containing resin, or making a filler be included in the seal material 600. The columnar spacer has a feature of being formed from an organic resin material containing at least one of acrylic, polyimide, polyimide amide, and epoxy as its main component, a material of any one of silicon oxide, silicon nitride, and silicon oxide containing nitrogen, or an inorganic material including a multilayer film thereof.

Figure 13D:
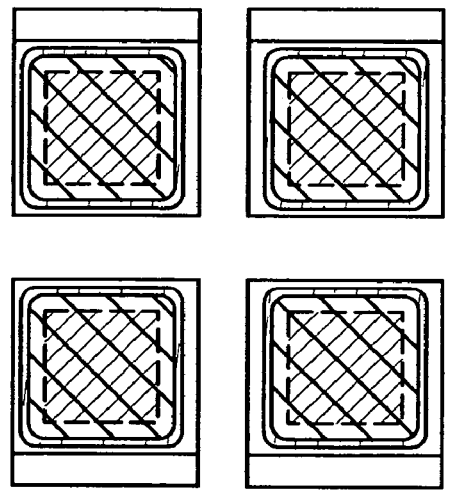

Next, the substrate is divided. In the case of taking out many panels, the respective panels are divided. In the case of taking out one panel, a dividing step can be omitted by pasting the counter substrate which has been cut in advance (FIG. 13D).

Then, an FPC (Flexible Printed Circuit) is pasted through an anisotropic conductive layer by a known technique. With these steps, a liquid crystal display device is completed. Further, an optical film is pasted if necessary. In the case of a transmission-type liquid crystal display device, a polarizing plate is pasted to both of the TFT substrate and the counter substrate.

Figure 18A:
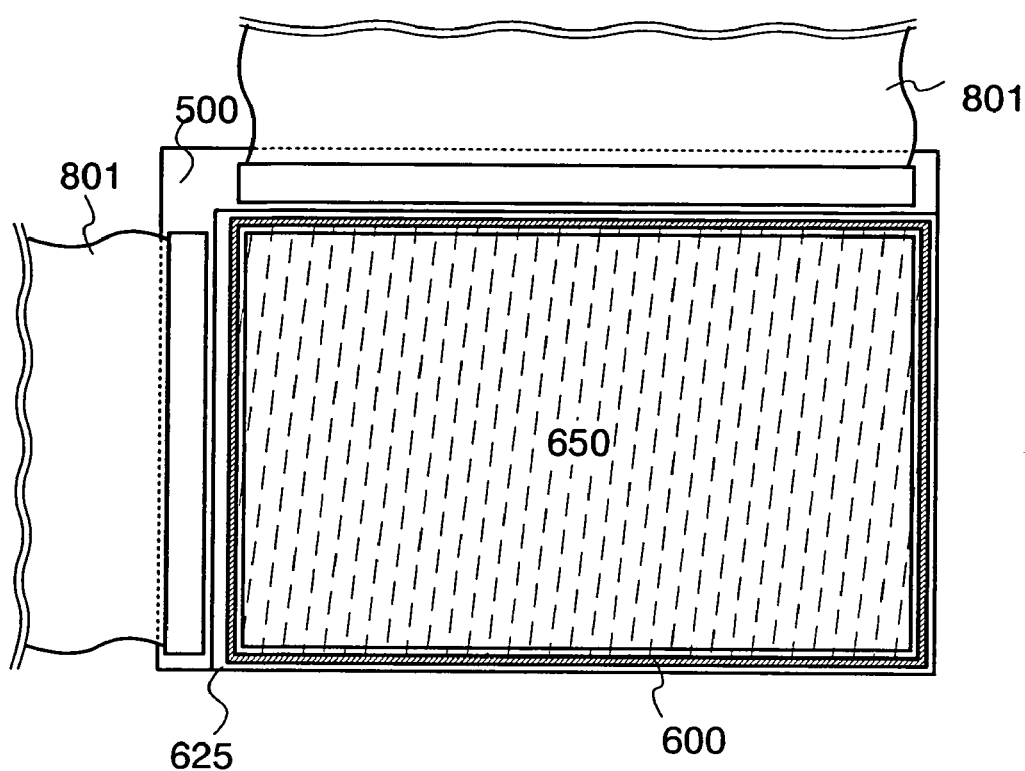
FIGS. 18A and 18B are views showing a manufacturing process of a liquid crystal display device according to the invention.
Figure 18B:
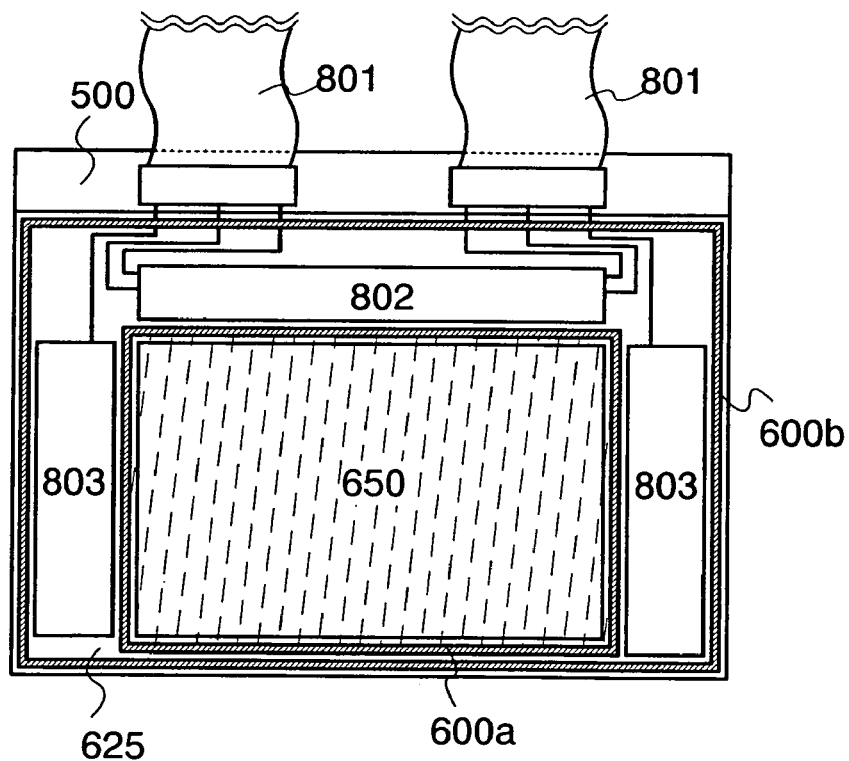

FIG. 18A shows a top view of the liquid crystal display device obtained through the above steps and FIG. 18B shows an example of a top view of another liquid crystal display device.

In FIG. 18A, reference numeral 500 denotes a TFT substrate; 625, a counter substrate; 650, a pixel portion; 600, a seal material; and 801, a FPC. A liquid crystal composition is injected by a droplet discharge method, and the pair of substrates 500 and 625 is pasted to each other with the seal material 600 under low pressure.

In FIG. 18B, reference numeral 500 denotes a TFT substrate; 625, a counter substrate; 802, a source signal line driver circuit portion; 803, a gate signal line driver circuit portion; 650, a pixel portion; 600a, a first seal material; and 801, a FPC. A liquid crystal composition is injected by a droplet discharge method, and the pair of substrates 500 and 625 is pasted to each other with the first seal material 600a and a second seal material 600b. A liquid crystal is not required in the driver circuit portions 802 and 803; therefore, a liquid crystal is held only in the pixel portion 650, and the second seal material 600b is provided in order to reinforce the whole panel.

As described above, in this embodiment, a liquid crystal display device can be manufactured using a TFT including a crystalline semiconductor film and using a liquid crystal composition according to the invention. Thus, manufacturing time and manufacturing cost can be reduced. The liquid crystal display devices manufactured in this embodiment can be used as display portions of various electronic apparatuses.

Although the TFT is the top-gate TFT in this embodiment, the invention is not limited to the structure of the TFT. A bottom-gate (reversely-staggered) TFT or a staggered TFT can also be employed appropriately. Further, not only the TFT having a single gate structure but also a multi-gate structure TFT having a plurality of channel-forming regions, for example a double-gate TFT, is applicable.

This embodiment can be freely combined with any description of embodiment modes and embodiments described above if necessary.

Embodiment 7

This embodiment shows an example of using a droplet discharge method of dropping a liquid crystal composition. In this embodiment, a manufacturing example of taking out four panels using a large substrate 1110 is shown in FIGS. 14A to 14D, FIGS. 15A and 15B, and FIGS. 16A and 16B.

Figure 14A:
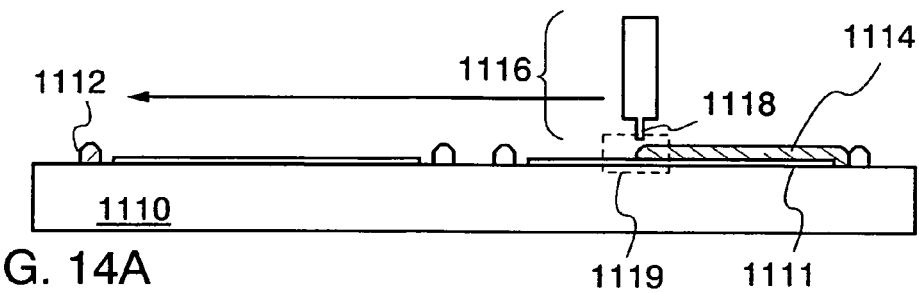
FIGS. 14A to 14D are views showing a manufacturing process of a liquid crystal display device using a liquid crystal dropping method according to the invention.

FIG. 14A is a cross-sectional view in which a liquid crystal layer is partway formed by a dispenser (or ink jet). A liquid crystal composition 1114 is discharged, sprayed, or dropped from a nozzle 1118 of a droplet discharge apparatus 1116 so as to cover a pixel portion 1111 surrounded by a seal material 1112. The droplet discharge apparatus 1116 is moved in a direction of an arrow in FIG. 14A. Although an example of moving the nozzle 1118 is shown here, the liquid crystal layer may be formed by moving the substrate with the nozzle fixed.

Figure 14B:
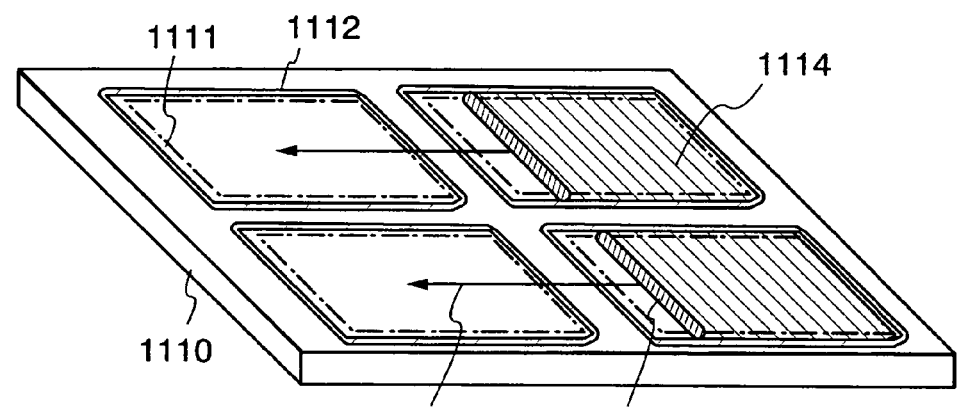

FIG. 14B is a perspective view, which shows that a liquid crystal composition 1114 is selectively discharged, sprayed, or dropped only in a region surrounded by a seal material 1112 and that a dropping plane 1115 is moved in accordance with a nozzle scanning direction 1113.

Figures 14C, 14D:
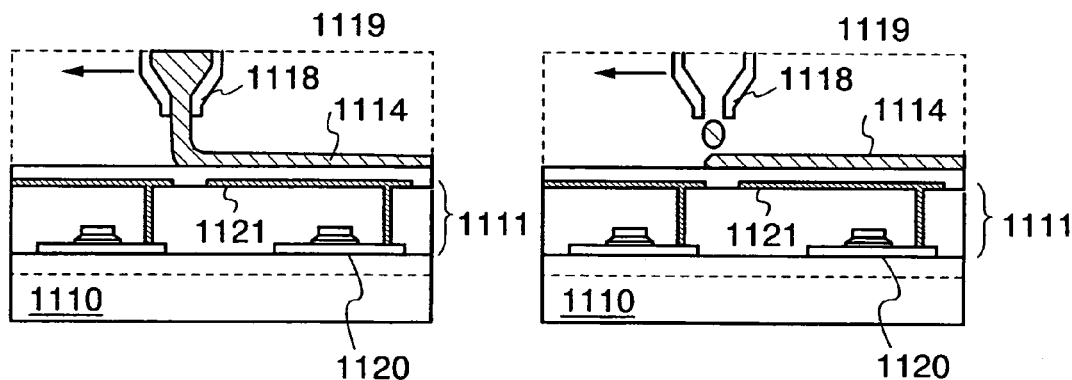

FIGS. 14C and 14D are cross-sectional views in which a part 1119 surrounded by a dotted line in FIG. 14A is magnified. If the liquid crystal composition has high viscosity, the liquid crystal composition is discharged continuously and adhered while connected in a row as shown in FIG. 14C. Meanwhile, if the liquid crystal composition has low viscosity, the liquid crystal composition is discharged intermittently, and the droplet is discharged as shown in FIG. 14D.

In FIG. 14C, reference numeral 1120 denotes a top-gate TFT, and reference numeral 1121 denotes a pixel electrode. A pixel portion 1111 includes pixel electrodes arranged in a matrix pattern, switching elements connected to the pixel electrodes, here top-gate TFTs, and storage capacitors.

Although the top-gate TFT is used in this embodiment, a bottom-gate TFT may also be used.

Here, a flow of manufacturing a panel is hereinafter explained with reference to FIGS. 15A and 15B and FIGS. 16A and 16B.

Figure 15A:
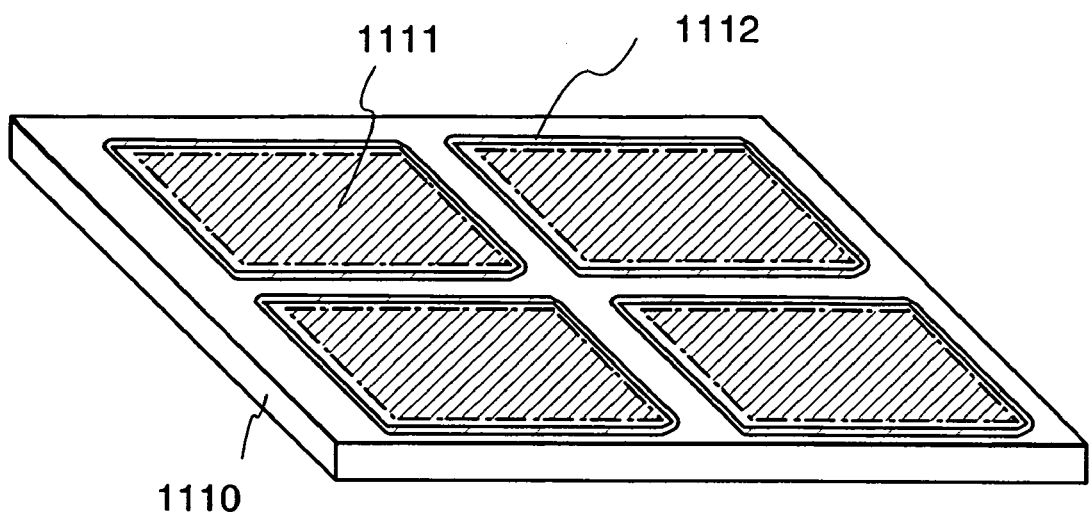
FIGS. 15A and 15B are views showing a manufacturing process of a liquid crystal display device using a liquid crystal dropping method according to the invention.

First, a first substrate 1110 having an insulating surface over which a pixel portion 1111 is formed is prepared. To the first substrate 1110, formation of an orientation film, rubbing treatment, spraying spherical spacers or formation of columnar spacer, formation of a color filter, or the like are conducted in advance. Subsequently, a seal material 1112 is formed at a predetermined location (a pattern surrounding the pixel portion 1111) over the first substrate 1110 by a dispenser apparatus or an ink-jet apparatus under an inert gas atmosphere or under low pressure as shown in FIG. 15A. As the seal material 1112 which is semi-transparent, a seal material which includes a filler (diameter of 6 μm to 24 μm) and has a viscosity of 40 Pa·s to 400 Pa·s is used. It is preferable to select a material which is insoluble in a liquid crystal to be in contact later. As the seal material 1112, acrylic photo-curable resin or acrylic heat curable resin may be used. The seal material 1112 can also be formed by a printing method because the seal pattern is simple.

Figure 15B:
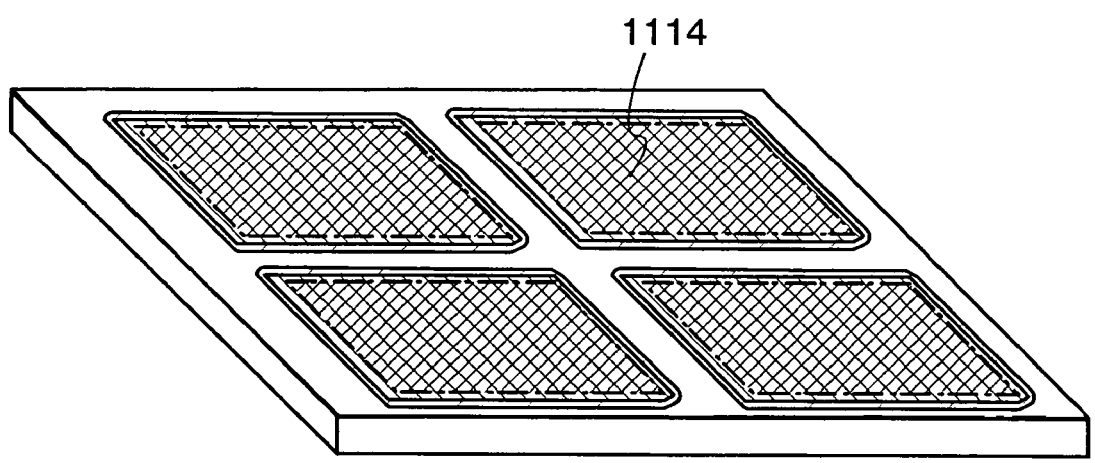

Next, a liquid crystal composition 1114 is dropped in a region surrounded by the seal material 1112 by an ink-jet method (FIG. 15B). As the liquid crystal composition 1114, a liquid crystal composition shown in Embodiments 1 to 4 may be used. Since the viscosity of the liquid crystal composition can be set by adjusting the temperature, the liquid crystal composition is suitable for an ink-jet method. According to an ink-jet method, only a necessary amount of the liquid crystal composition 1114 can be held in the region surrounded by the seal material 1112 without any waste.

Next, the first substrate 1110 provided with the pixel portion 1111 and a second substrate 1031 provided with a counter electrode or an orientation film are pasted to each other under low pressure so that a bubble does not enter (FIG. 16A). Here, the seal material 1112 is cured by conducting ultraviolet light irradiation or heat treatment at the same time as the pasting. The heat treatment may be conducted in addition to the ultraviolet light irradiation.

Figure 17A:
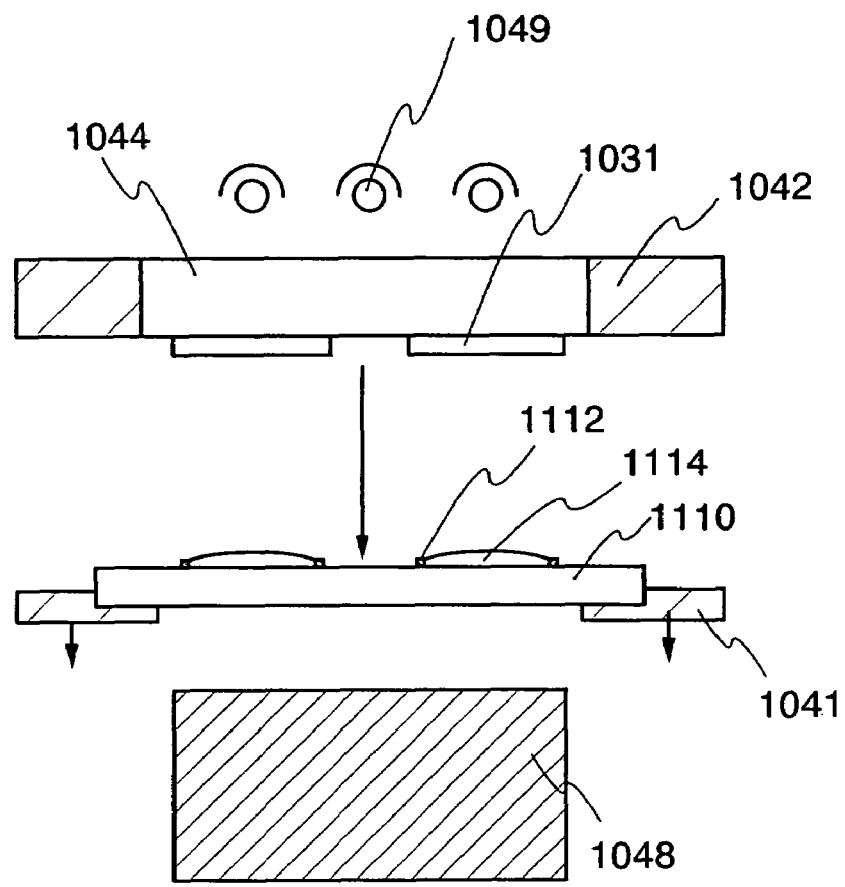
FIGS. 17A and 17B are views showing a manufacturing process of a liquid crystal display device using a liquid crystal dropping method according to the invention.
Figure 17B:
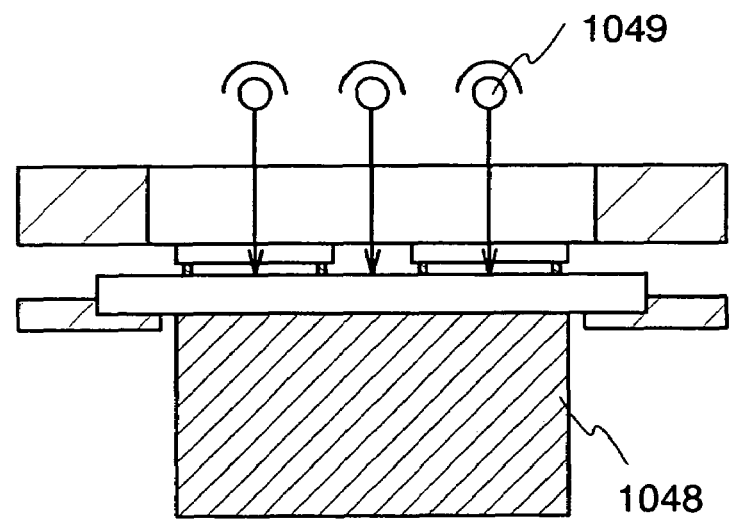

FIGS. 17A and 17B show an example of a pasting apparatus which can conduct ultraviolet light irradiation or heat treatment at the pasting or after the pasting.

In FIGS. 17A and 17B, reference numeral 1041 denotes a first substrate supporting stand; 1042, a second substrate supporting stand; 1044, a light-transmitting window; 1048, a lower stool; and 1049, a light source of ultraviolet light. In FIGS. 17A and 17B, the parts corresponding to those in FIGS. 14A to 14D, FIGS. 15A and 15B, and FIGS. 16A and 16B are denoted by the same reference numerals.

The lower stool 1048 incorporates a heater to cure the seal material 1112. The light-transmitting window 1044 is provided for the second substrate supporting stand 1042 so that ultraviolet light and the like from the light source 1049 pass therethrough. Here, although not shown, the position alignment of the substrate is conducted through the window 1044. A second substrate 1031 which is to be the counter substrate is cut into a desired size and fixed to the second substrate supporting stand 1042 by a vacuum chuck or the like in advance. FIG. 17A shows a state before the pasting.

At the pasting, after lowering the first substrate supporting stand 1041 and the second substrate supporting stand 1042, the first substrate 1110 and the second substrate 1031 are pasted to each other while pressure is applied thereto, and then ultraviolet light is emitted to cure. FIG. 17B shows a state after the pasting.

Subsequently, the first substrate 1110 is cut by a cutting apparatus such as a scriber apparatus, a breaker apparatus, or a roll cutter (FIG. 16B). Thus, four panels can be manufactured from one substrate. Then, an FPC is pasted by a known technique.

As the first substrate 1110 and the second substrate 1031, a glass substrate or a plastic substrate can be used.

This embodiment can be freely combined with any description of embodiment modes and embodiments described above if necessary.

Embodiment 8

As electronic apparatus to which the present invention is applicable, a video camera, a digital camera, a goggle-type display, a navigation system, a sound reproduction device (car audio composition or the like), a computer, a game machine, a mobile information terminal (a mobile computer, a mobile phone, a mobile game machine, an electronic book, or the like), an image reproduction device equipped with a recording medium (specifically, a device which can reproduce a recording medium such as Digital Versatile Disk (DVD) and has a display for displaying the image), and the like are given. Specific examples of these electronic apparatus are shown in FIG. 19, FIG. 20, FIGS. 21A and 21B, FIGS. 22A and 22B, FIG. 23, and FIGS. 24A to 24E.

Figure 19:
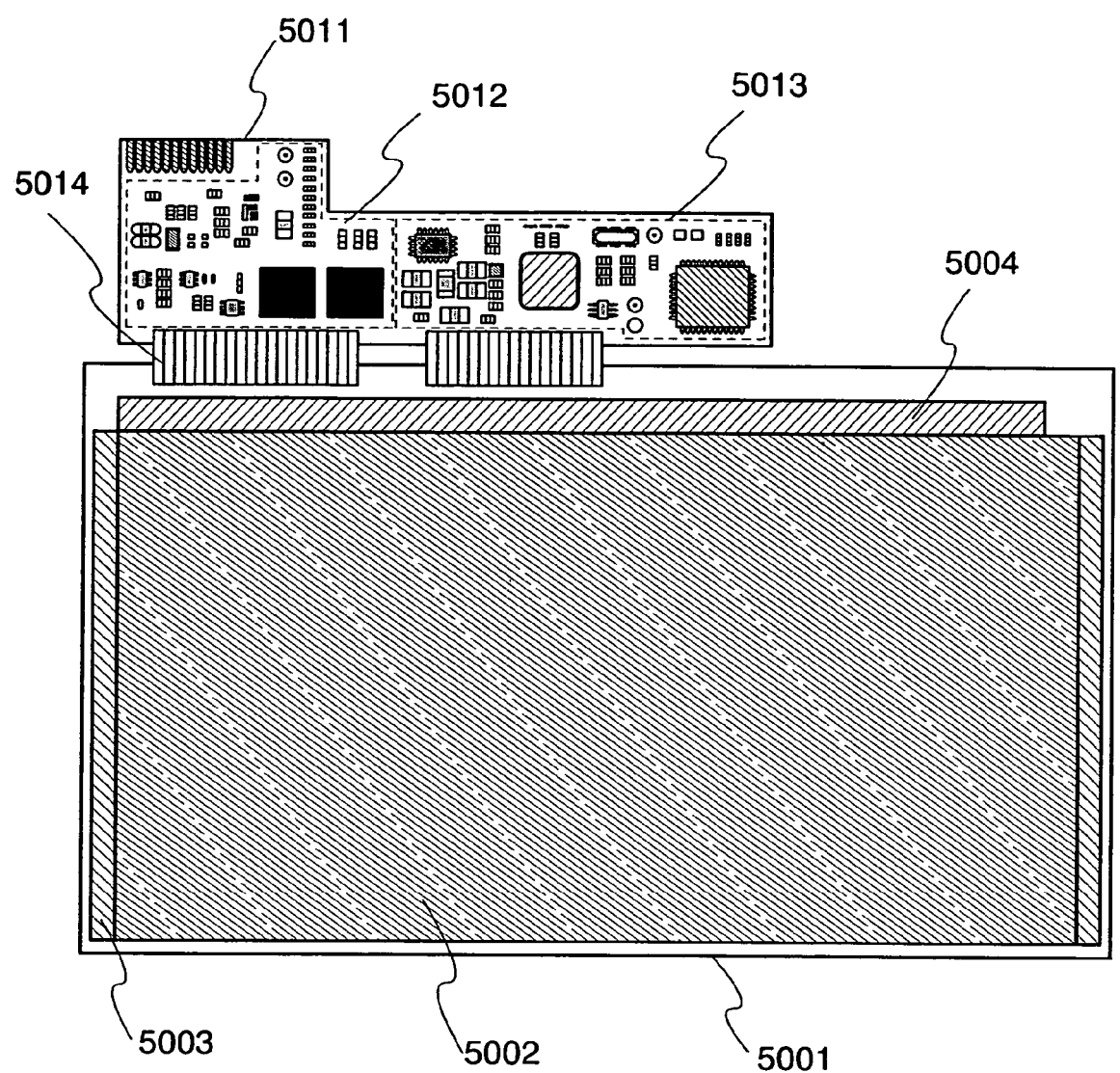
FIG. 19 is a view showing an example of an electronic apparatus to which the invention is applied.

FIG. 19 shows a liquid crystal module in which a display panel 5001 and a circuit substrate 5011 are combined. The circuit substrate 5011 is provided with a control circuit 5012, a signal dividing circuit 5013, and the like, and is electrically connected to the display panel 5001 through a connection wiring 5014.

This display panel 5001 is provided with a pixel portion 5002 with a plurality of pixels, a scanning line driver circuit 5003, and a signal line driver circuit 5004 for supplying a video signal to a selected pixel. In the case of manufacturing a liquid crystal module, the display panel 5001 may be manufactured using embodiment modes and embodiments described above. In addition, a control driver circuit portion such as the scanning line driver circuit 5003 or the signal line driver circuit 5004 can be manufactured using a TFT formed in accordance with the above embodiment mode.

Figure 20:
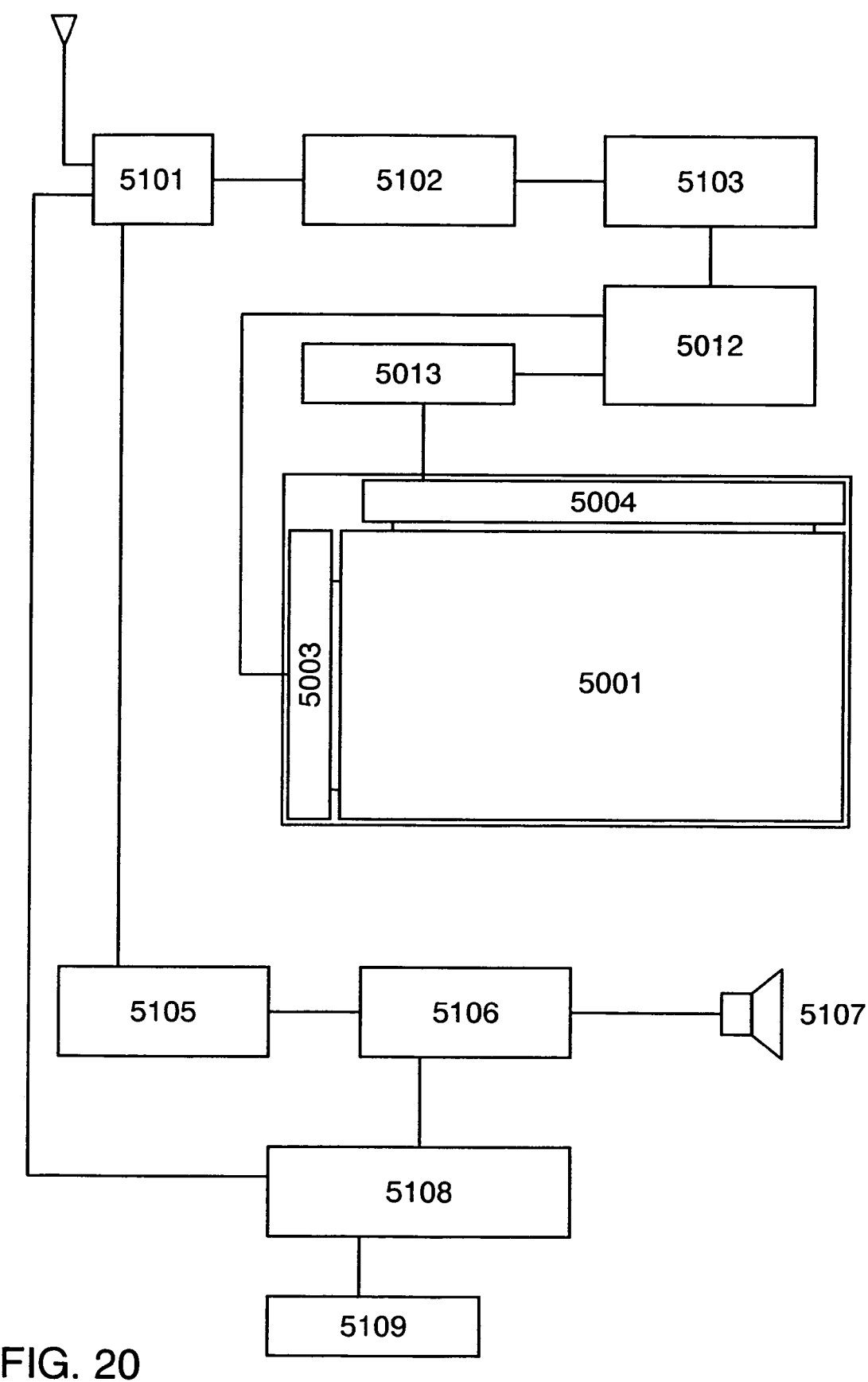
FIG. 20 is a view showing an example of an electronic apparatus to which the invention is applied.

A liquid crystal television set can be completed using the liquid crystal module shown in FIG. 19. FIG. 20 is a block diagram showing a principle configuration of a liquid crystal television set. A tuner 5101 receives a video signal and an audio signal. The video signal is processed by a video signal amplifier circuit 5102, a video signal processing circuit 5103 which converts signals outputted from the video signal amplifier circuit into chrominance signals corresponding to respective colors of red, green, and blue, and a control circuit 5012 which converts the video signal into an input specification of a driver IC. The control circuit 5012 outputs signals to both of a scanning line side and a signal line side. In the case of digital driving, a signal dividing circuit 5013 may be provided in the signal line side and an input digital signal may be divided into m pieces to be supplied.

An audio signal among signals received by the tuner 5101 is sent to an audio signal amplifier circuit 5105 and is supplied to a speaker 5107 through an audio signal processing circuit 5106. A control circuit 5108 receives control information about a receiving station (reception frequency) or sound volume from an input portion 5109 and transmits signals to the tuner 5101 or the audio signal processing circuit 5106.

Figure 21A:
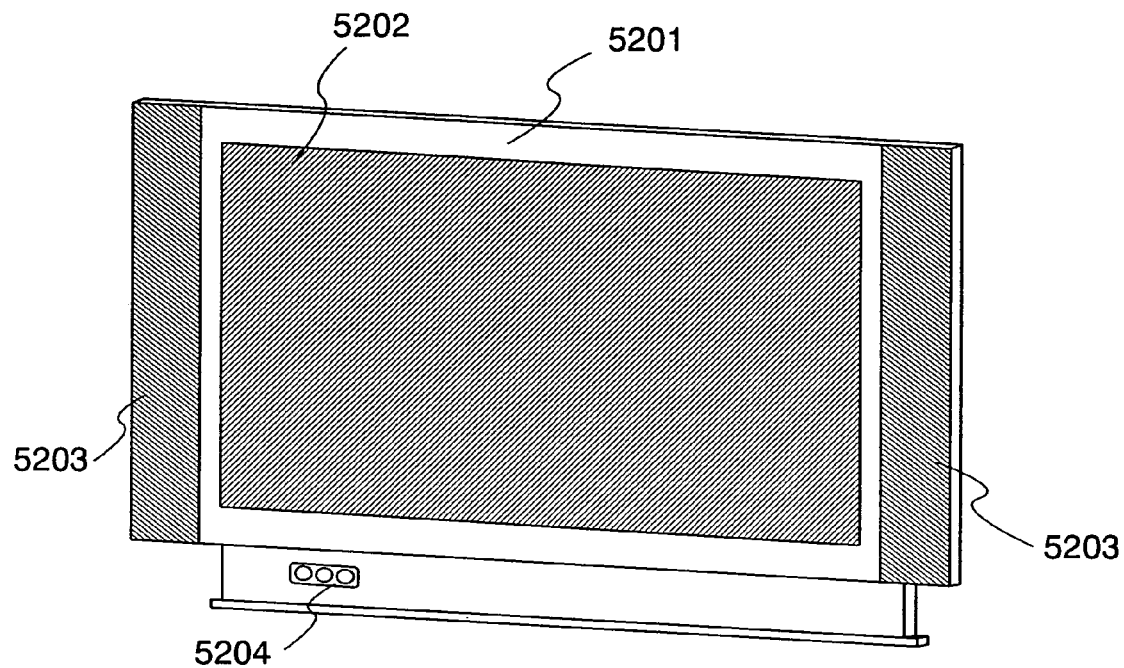
FIGS. 21A and 21B are views showing an example of an electronic apparatus to which the invention is applied.

As shown in FIG. 21A, a television set can be completed by incorporating the liquid crystal module into a chassis 5201. A display screen 5202 is formed by the liquid crystal module. The television set is appropriately provided with a speaker 5203, an operation switch 5204, and the like.

Figure 21B:
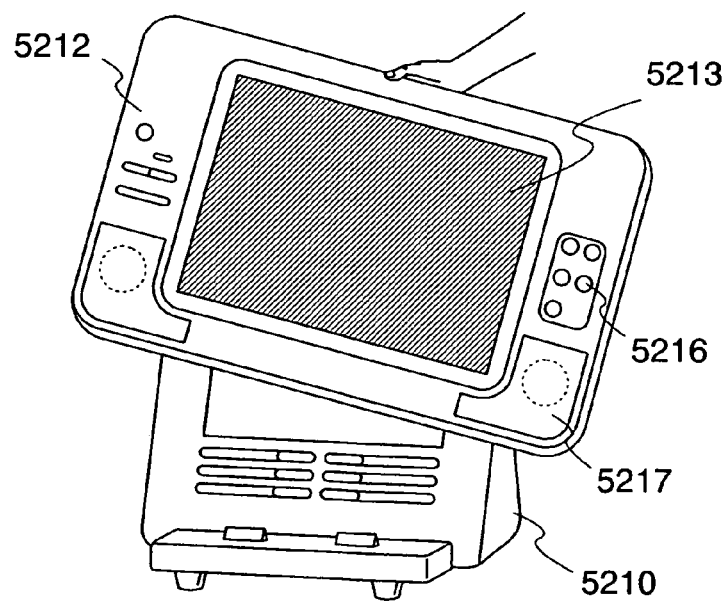

FIG. 21B shows a television set having a portable wireless display. A battery and a signal receiver are incorporated into a chassis 5212. The battery drives a display portion 5213 and a speaker portion 5217. The battery can be repeatedly charged by a battery charger 5210. The battery charger 5210 can send and receive a video signal and send a received video signal to the signal receiver of the display. The chassis 5212 is controlled by an operation key 5216. The apparatus shown in FIG. 21B can be referred to as a video-audio bidirectional communication device since a signal can be sent from the chassis 5212 to the battery charger 5210 by operating the operation key 5216. Further, the device can be referred to as a versatile remote control device since a signal can be sent from the chassis 5212 to the battery charger 5210 by operating the operation key 5216 and another electronic apparatus is made to receive a signal which can be sent by the battery charger 5210, accordingly, communication control of another electronic apparatus is realized. The invention can be applied to the display portion 5213, a control circuit portion, and the like.

A television set having a display portion which can respond at high speed can be manufactured by using the invention for a television set shown in FIG. 19, FIG. 20, and FIGS. 21A and 21B.

Of course, the invention is not limited to the television set, and can be applied to various use applications, for example, a large-size display medium such as an information display board in a train station, an airport, and the like, or an advertisement display board on the street, as well as a monitor of a personal computer.

Figure 22A:
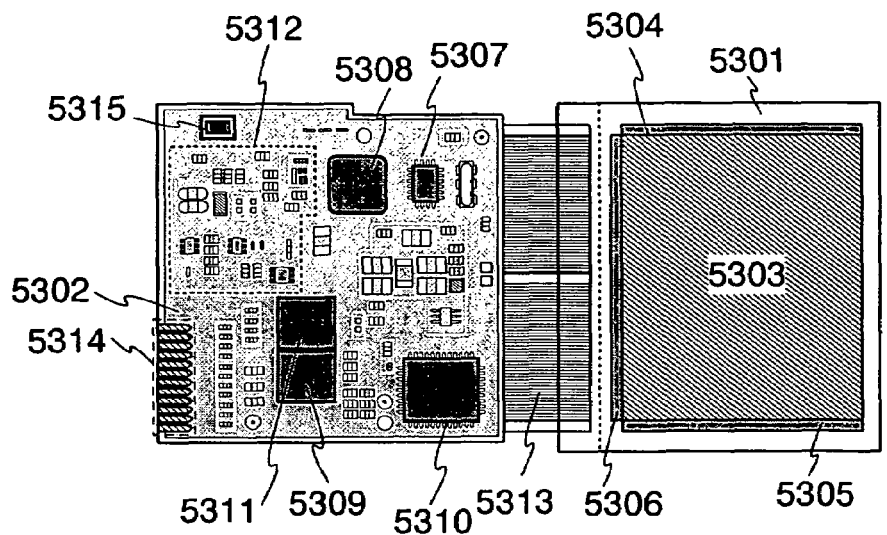
FIGS. 22A and 22B are views showing an example of an electronic apparatus to which the invention is applied.

FIG. 22A shows a module formed by combining a display panel 5301 and a printed wiring board 5302. The display panel 5301 is provided with a pixel portion 5303 with a plurality of pixels, a first scanning line driver circuit 5304, a second scanning line driver circuit 5305, and a signal line driver circuit 5306 for supplying a video signal to a selected pixel.

The printed wiring board 5302 is provided with a controller 5307, a central processing unit (CPU) 5308, a memory 5309, a power supply circuit 5310, an audio processing circuit 5311, a sending and receiving circuit 5312, and the like. The printed wiring board 5302 is connected to the display panel 5301 through a flexible printed circuit (FPC) 5313. The printed wiring board 5302 may be formed to have a structure in which a capacitor element, a buffer circuit, and the like are provided to prevent noise from causing in power supply voltage or a signal or the rising of a signal from dulling. The controller 5307, the audio processing circuit 5311, the memory 5309, the CPU 5308, the power supply circuit 5310, and the like can be mounted to the display panel 5301 by using a COG (Chip on Glass) method. By means of the COG method, the size of the printed wiring board 5302 can be reduced.

Various control signals are inputted or outputted through an interface (I/F) 5314 which is provided for the printed wiring board 5302. An antenna port 5315 for sending and receiving to/from an antenna is provided for the printed wiring board 5302.

Figure 22B:
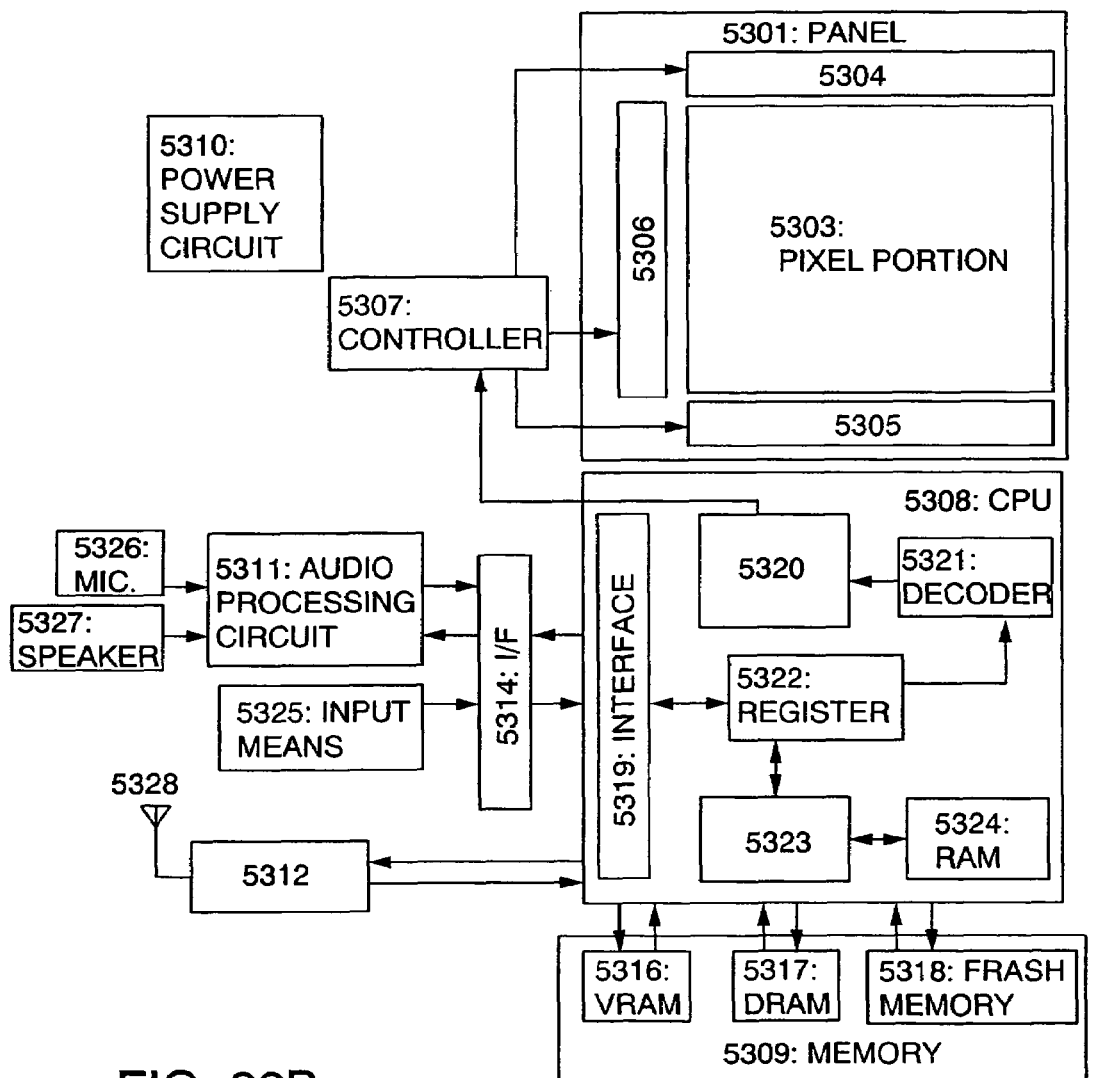

FIG. 22B is a block diagram showing the module shown in FIG. 22A. The module includes a VRAM 5316, a DRAM 5317, a flash memory 5318, and the like as a memory 5309. The VRAM 5316 stores data on an image displayed on a panel, the DRAM 5317 stores image data or audio data, and the flash memory stores various programs.

A power supply circuit 5310 supplies electric power for operating a display panel 5301, a controller 5307, a CPU 5308, an audio processing circuit 5311, the memory 5309, and a sending and receiving circuit 5312. A current source may be provided to the power supply circuit 5310 depending on a panel specification.

The CPU 5308 includes a control signal generation circuit 5320, a decoder 5321, a register 5322, an arithmetic circuit 5323, a RAM 5324, an interface 5319 for the CPU 5308, and the like. Various signals inputted to the CPU 5308 through the interface 5319 is once stored in the register 5322, and inputted to the arithmetic circuit 5323, the decoder 5321, or the like. The arithmetic circuit 5323 performs an arithmetical operation based on the inputted signal to specify a location to which various instructions are sent. On the other hand, the signal inputted to the decoder 5321 is decoded and inputted to the control signal generation circuit 5320. The control signal generation circuit 5320 produces a signal including various instructions based on the inputted signal to send the produced signal to the location which is specified in the arithmetic circuit 5323, specifically, the memory 5309, the sending and receiving circuit 5312, the audio processing circuit 5311, the controller 5307, and the like.

The memory 5309, the sending and receiving circuit 5312, the audio processing circuit 5311, and the controller 5307 each operate in accordance with each of the received instructions. Hereinafter, the operation is briefly explained.

The signal inputted from an input means 5325 is sent to the CPU 5308 mounted to the printed wiring board 5302 through an I/F 5319. The control signal generation circuit 5320 converts image data stored in the VRAM 5316 into a predetermined format to send the converted data to the controller 5307 in accordance with the signal sent from the input means 5325 such as a pointing device or a keyboard.

The controller 5307 carries out data processing for the signal including the image data sent from the CPU 5308 along with the panel specification to supply the signal to the display panel 5301. Further, the controller 5307 produces a Hsync signal, a Vsync signal, a clock signal CLK, an alternating voltage (AC Cont), and a switching signal L/R based on power supply voltage inputted from the power supply circuit 5310 or various signals inputted from the CPU 5308 to supply the signals to the display panel 5301.

The sending and receiving circuit 5312 processes a signal which is to be sent or received by an antenna 5328 as an electric wave, specifically, the sending and receiving circuit 5312 includes a high frequency circuit such as isolator, a band pass filter, a VCO (Voltage Controlled Oscillator), an LPF (Low Pass Filter), a coupler, or a balun. A signal including audio information among signals which are sent or received in the sending and receiving circuit 5312 is sent to the audio processing circuit 5311 in accordance with an instruction from the CPU 5308.

The signal including audio information which is sent in accordance with the instruction from the CPU 5308 is demodulated in the audio processing circuit 5311 and sent to a speaker 5327. An audio signal sent from a microphone 5326 is modulated in the audio processing circuit 5311 and sent to the sending and receiving circuit 5312 in accordance with an instruction from the CPU 5308.

The controller 5307, the CPU 5308, the power supply circuit 5310, the audio processing circuit 5311, and the memory 5309 can be mounted as a package in accordance with this embodiment. This embodiment can be applied to any circuit except a high frequency circuit such as isolator, a band pass filter, a VCO (Voltage Controlled Oscillator), an LPF (Low Pass Filter), a coupler, or a balun.

Figure 23:
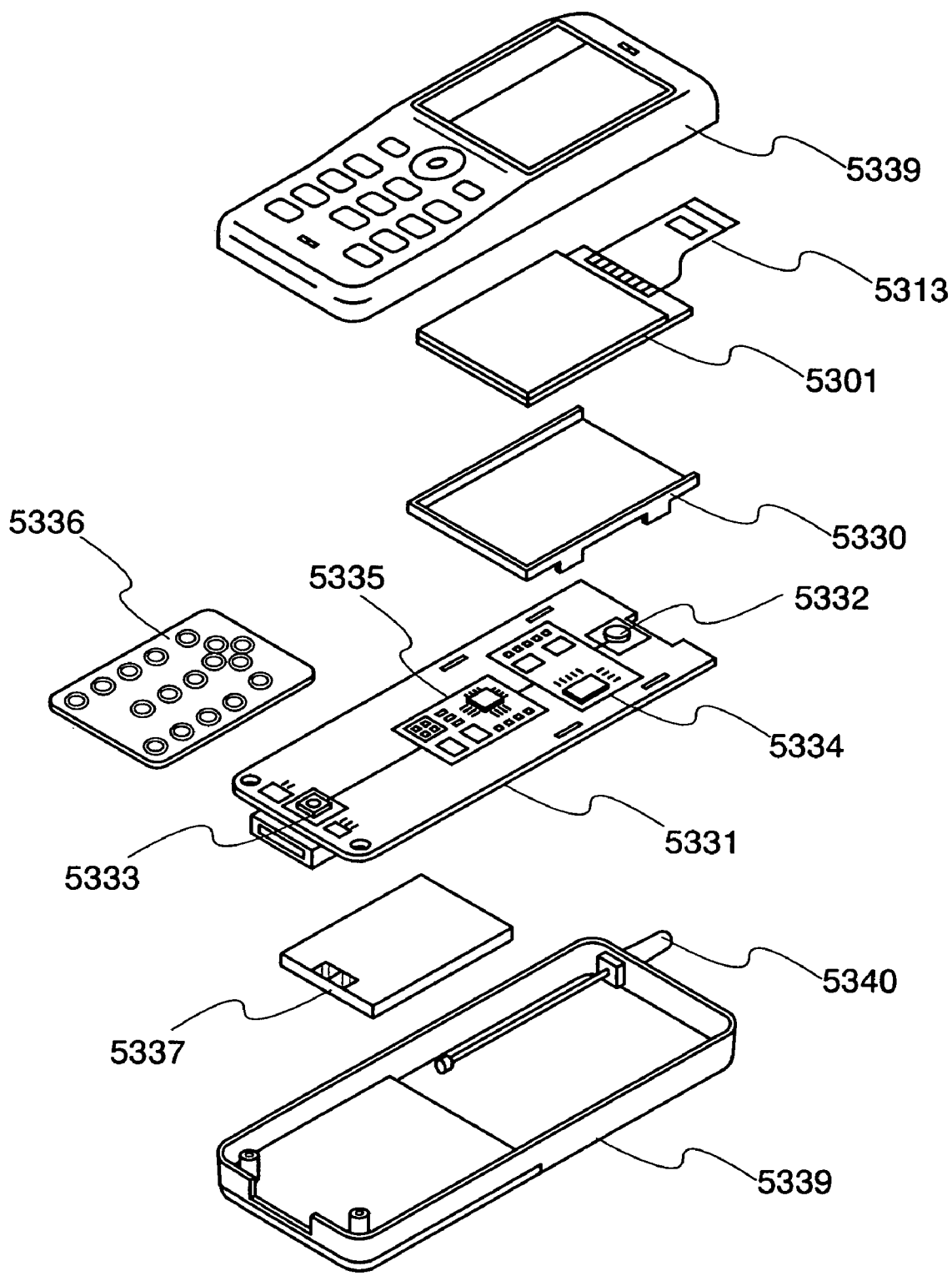
FIG. 23 is a view showing an example of an electronic apparatus to which the invention is applied.

FIG. 23 shows one mode of a mobile phone including a module shown in FIGS. 22A and 22B. A display panel 5301 is incorporated into a housing 5330 so as to be freely detached/attached. The shape or the size of the housing 5330 can be appropriately changed depending on the size of the display panel 5301. The housing 5330 to which the display panel 5301 is fixed is fitted into a printed substrate 5331 and built as a module.

The display panel 5301 is connected to the printed substrate 5331 through a FPC 5313. The printed substrate 5331 is provided with a speaker 5332, a microphone 5333, a sending and receiving circuit 5334, and a signal processing circuit 5335 including a CPU, a controller, and the like. Such a module is combined with an input means 5336, a battery 5337, and an antenna 5340 to be stored in a chassis 5339. A pixel portion of the display panel 5301 is arranged so as to be visible from an opening window which is provided for the chassis 5339.

The mobile phone in accordance with this embodiment can be transformed into various modes depending on its functions or usages. For example, the mobile phone can have the foregoing operation and effect even when the mobile phone is manufactured to have a plurality of display panels or have an opening and shutting structure with a hinge by dividing the chassis into a plurality of pieces appropriately.

By applying the invention to the mobile phone shown in FIGS. 22A and 22B, and FIG. 23, the mobile phone which can respond at high speed can be manufactured.

Figure 24A:
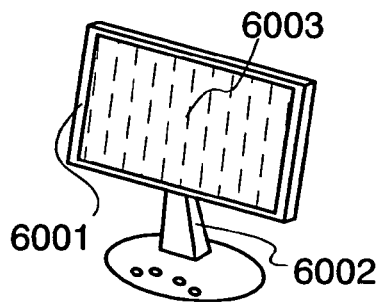
FIGS. 24A to 24E are views showing an example of an electronic apparatus to which the invention is applied.

FIG. 24A shows a liquid crystal display, which includes a chassis 6001, a supporting stand 6002, a display portion 6003, and the like. The invention can be applied to the display portion 6003 using a structure of a liquid crystal module shown in FIG. 19 and a display panel shown in FIG. 22A.

A display having a display portion which can respond at high speed can be manufactured using the invention.

Figure 24B:
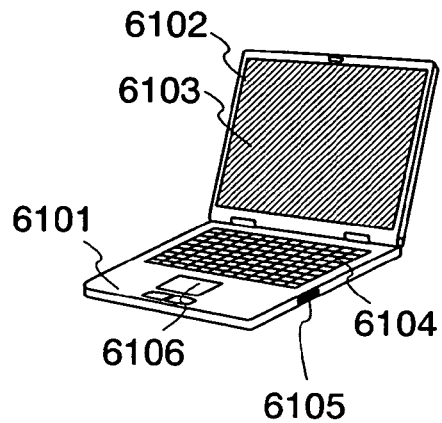

FIG. 24B shows a computer, which includes a main body 6101, a chassis 6102, a display portion 6103, a keyboard 6104, an external connection port 6105, a pointing mouse 6106, and the like. The invention can be applied to the display portion 6103 using a structure of the liquid crystal module shown in FIG. 19 and the display panel shown in FIG. 22A.

A computer having a display portion which can respond at high speed can be manufactured using the invention.

Figure 24C:
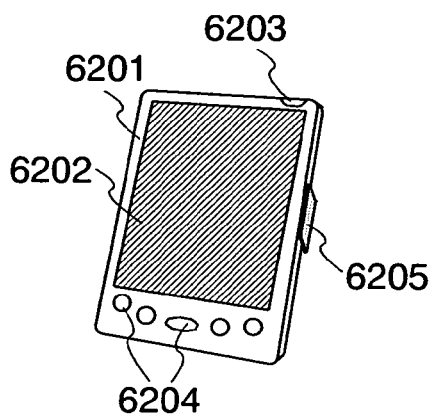

FIG. 24C shows a portable computer, which includes a main body 6201, a display portion 6202, a switch 6203, an operation key 6204, an infrared port 6205, and the like. The invention can be applied to the display portion 6202 using a structure of the liquid crystal module shown in FIG. 19 and the display panel shown in FIG. 22A.

A computer having a display portion which can respond at high speed can be manufactured using the invention.

Figure 24D:
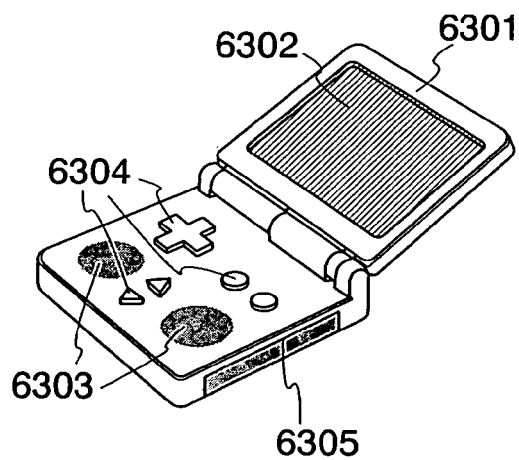

FIG. 24D shows a portable game machine, which includes a chassis 6301, a display portion 6302, a speaker portion 6303, an operation key 6304, a recording medium insert portion 6305, and the like. The invention can be applied to the display portion 6302 using a structure of the liquid crystal module shown in FIG. 19 and the display panel shown in FIG. 22A.

A game machine having a display portion which can respond at high speed can be manufactured using the invention.

Figure 24E:
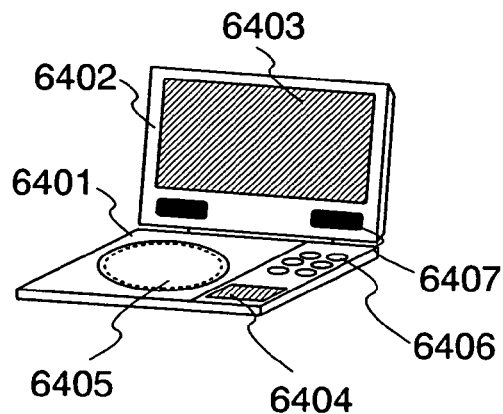

FIG. 24E shows a portable image reproducing device provided with a recording medium (specifically, a DVD reproducing device), which includes a main body 6401, a chassis 6402, a display portion A 6403, a display portion B 6404, a recording medium (DVD or the like) reading portion 6405, an operation key 6406, a speaker portion 6407, and the like. The display portion A 6403 is used mainly for displaying image information, and the display portion B 6404 is used mainly for displaying character information. The invention can be applied to the display portion A 6403, the display portion B 6404, a control circuit portion, and the like using a structure of the liquid crystal module shown in FIG. 19 and the display panel shown in FIG. 22A. In addition, the image reproducing device provided with a recording medium further includes a home video game machine and the like.

An image reproducing device having a display portion which can respond at high speed can be manufactured using the invention.

The display devices used in these electronic devices can use not only a glass substrate but also a heat-resistant plastic substrate in accordance with the size, the strength, or the intended purpose. This can achieve further lightness in weight.

The example shown in this embodiment is just one example, and the invention is not limited to these usages.

This embodiment can be freely combined with any description of embodiment modes and embodiments described above if necessary.

This application is based on Japanese Patent Application serial No. 2004-325112 field in Japan Patent Office on Nov. 9, 2004, the contents of which are hereby incorporated by reference.

What is claimed is:

1. A liquid crystal composition comprising:
   a nematic liquid crystal; and
   an inert material expressed by at least one of $C_mF_n$ and $C_mF_nO$ (n and m are natural numbers),
   wherein a content of the inert material is from 20 wt % to 30 wt % with respect to the liquid crystal composition.

2. A liquid crystal composition according to claim 1, wherein the inert material is at least one selected from the group consisting of $C_8F_{16}O$, $C_8F_{13}$ and $C_6F_{14}$.

3. A liquid crystal composition according to claim 1, wherein the inert material comprises an inert fluid.

4. A liquid crystal composition comprising:
   a nematic liquid crystal; and
   an inert composition expressed by at least one of $C_mY_n$ and $C_mF_nO$ (n and m are natural numbers),
   wherein a content of the inert material is from 10 wt % to 60 wt % with respect to the liquid crystal composition.

5. A liquid crystal composition according to clam 4, wherein the inert material is at least one selected from the group consisting of $C_8F_{16}O$, $C_8F_{18}$ and $C_6F_{14}$.

6. A liquid crystal composition according to claim 4, wherein the inert material comprises an inert fluid.

7. An electro-optical device comprising;
   a pair of substrates having a transparent electrode; and
   a liquid crystal composition interposed between the pair of substrates,
   wherein the liquid crystal composition comprises a nematic liquid crystal, and an inert material expressed by at least one of $C_mF_n$ and $C_mF_nO$ (n and m are natural numbers),
   wherein a content of the inert material is from 20 wt % to 30 wt % with respect to the liquid crystal composition.

8. An electro-optical device according to claim 7, wherein the inert material is at least one selected from the group consisting of $C_8F_{16}O$, $C_8F_{18}$, and $C_6F_{14}$.

9. An electro-optical device according to claim 7, wherein the inert material comprises an inert fluid.

10. An electro-optical device comprising:
    a pair of substrates having a transparent electrode; and
    a liquid crystal composition interposed between the pair of substrates,
    wherein the liquid crystal composition comprises a nematic liquid crystal, and an inert material expressed by at least one of $C_mF_n$ and $C_mF_nO$ (n and m are natural numbers), and
    wherein a content of the inert material is from 10 wt % to 60 wt % with respect to the liquid crystal composition.

11. An electro-optical device according to claim 10, wherein the inert material is at least one selected from the group consisting of $C_8F_{16}O$, $C_8F_{18}$, and $C_6F_{14}$.

12. An electro-optical device according to claim 10, wherein the inert material comprises an inert fluid.

* * * * *